(12) United States Patent
You

(10) Patent No.: US 12,563,440 B2
(45) Date of Patent: Feb. 24, 2026

(54) DATA TRANSMISSION METHOD, APPARATUS, AND SYSTEM

(71) Applicant: HUAWEI TECHNOLOGIES CO., LTD., Shenzhen (CN)

(72) Inventor: Chunhua You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/397,410

(22) Filed: Dec. 27, 2023

(65) Prior Publication Data

US 2024/0129788 A1 Apr. 18, 2024

Related U.S. Application Data

(63) Continuation of application No. PCT/CN2022/092524, filed on May 12, 2022.

(30) Foreign Application Priority Data

Jun. 30, 2021 (CN) .......................... 202110738628.1

(51) Int. Cl.
*H04W 28/02* (2009.01)
(52) U.S. Cl.
CPC ... *H04W 28/0268* (2013.01); *H04W 28/0252* (2013.01)
(58) Field of Classification Search
CPC ......... H04W 28/0268; H04W 28/0252; H04W 28/06; H04W 28/065
See application file for complete search history.

(56) References Cited

U.S. PATENT DOCUMENTS

2018/0097918 A1    4/2018  Nuggehalli et al.
2021/0058818 A1*   2/2021  Zhang ................. H04W 28/065

FOREIGN PATENT DOCUMENTS

CN      110474924  A    11/2019
JP      2009267841  A    11/2009
(Continued)

OTHER PUBLICATIONS

Ericsson et al., "Data Forwarding for Inter-System HO with Functions Available from Intra-System Data Forwarding—or: Why Option 3 Fulfils All Requirements and Should Be Chosen", 3GPP TSG RAN WG3 #102, R3-186804, Spokane, WA, U.S., Nov. 12-16, 2018, 11 pages.

(Continued)

*Primary Examiner* — Caroline H Jahnige
(74) *Attorney, Agent, or Firm* — Maier & Maier, PLLC

(57)    ABSTRACT

A data transmission method, an apparatus, and a system. The method includes: a source network device performs cascading processing on at least two data units to obtain a first data packet, where data included in the at least two data units belongs to a same radio bearer or quality of service flow of a terminal device, and the first data packet is a packet data convergence protocol (PDCP) layer data packet or a service data adaptation protocol (SDAP) layer data packet; and sends the first data packet to a target network device through a first tunnel. According to the foregoing method, a plurality of data units is cascaded to obtain one data packet, so that header overheads of the cascaded data packet can be reduced, lossless handover under a cascading function can be implemented, and a cascading gain can be obtained.

16 Claims, 14 Drawing Sheets

(56) References Cited

FOREIGN PATENT DOCUMENTS

| | | | |
|---|---|---|---|
| JP | 2019533392 A | 11/2019 | |
| WO | 2008123127 A1 | 10/2008 | |
| WO | 2008136294 A1 | 11/2008 | |
| WO | WO-2018203734 A1 * | 11/2018 | ........ H04W 36/0011 |
| WO | 2020089849 A1 | 5/2020 | |

OTHER PUBLICATIONS

Ericsson et al., "Intersystem Data Forwarding—Current Status of Discussions and Way Forward", 3GPP TSG-RAN WG3 Meeting #103, R3-190790, Athens, Greece, Feb. 25-Mar. 1, 2019, 18 pages.

* cited by examiner

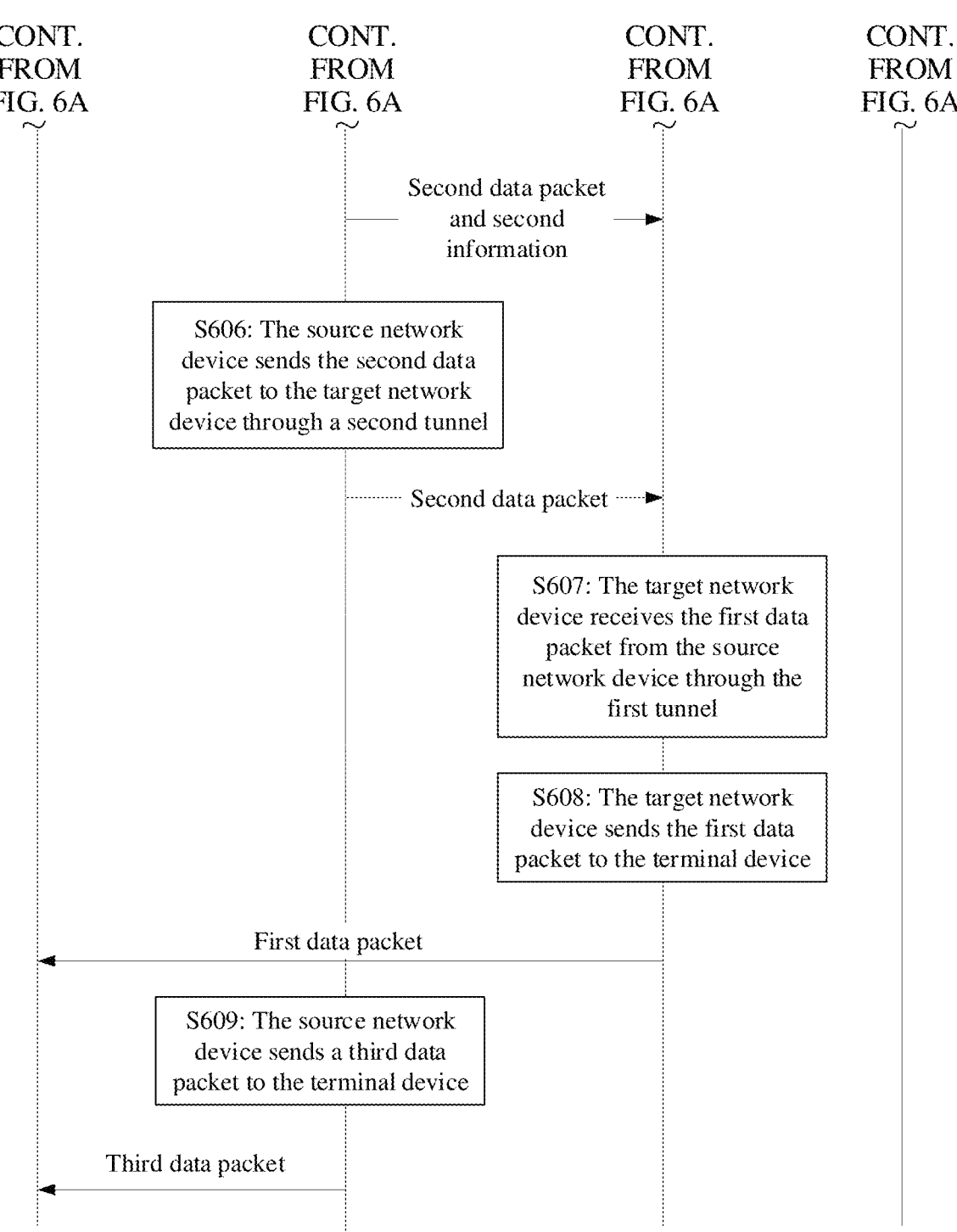

CONT.
FROM
FIG. 6A

CONT.
FROM
FIG. 6A

CONT.
FROM
FIG. 6A

CONT.
FROM
FIG. 6A

Second data packet
and second
information

S606: The source network
device sends the second data
packet to the target network
device through a second tunnel Second data packet S607: The target network
device receives the first data
packet from the source
network device through the
first tunnel S608: The target network
device sends the first data
packet to the terminal device First data packet S609: The source network
device sends a third data
packet to the terminal device Third data packet

FIG. 6B

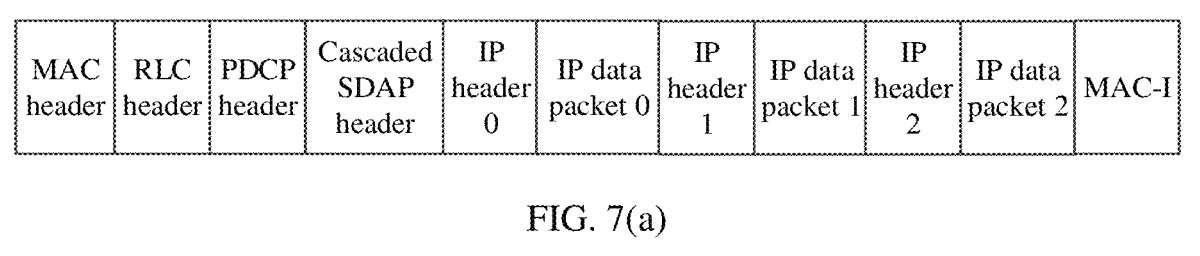

| MAC header | RLC header | PDCP header | Cascaded SDAP header | IP header 0 | IP data packet 0 | IP header 1 | IP data packet 1 | IP header 2 | IP data packet 2 | MAC-I |
|---|---|---|---|---|---|---|---|---|---|---|

FIG. 7(a)

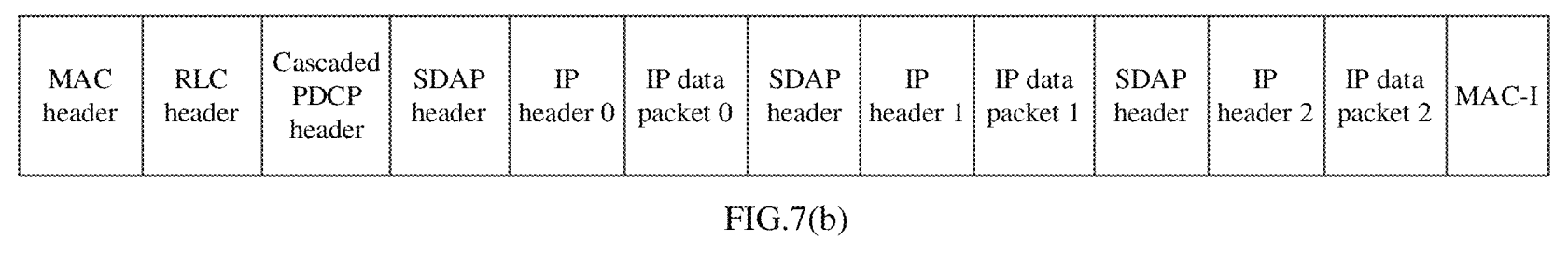

| MAC header | RLC header | Cascaded PDCP header | SDAP header | IP header 0 | IP data packet 0 | SDAP header | IP header 1 | IP data packet 1 | SDAP header | IP header 2 | IP data packet 2 | MAC-I |
|---|---|---|---|---|---|---|---|---|---|---|---|---|

FIG.7(b)

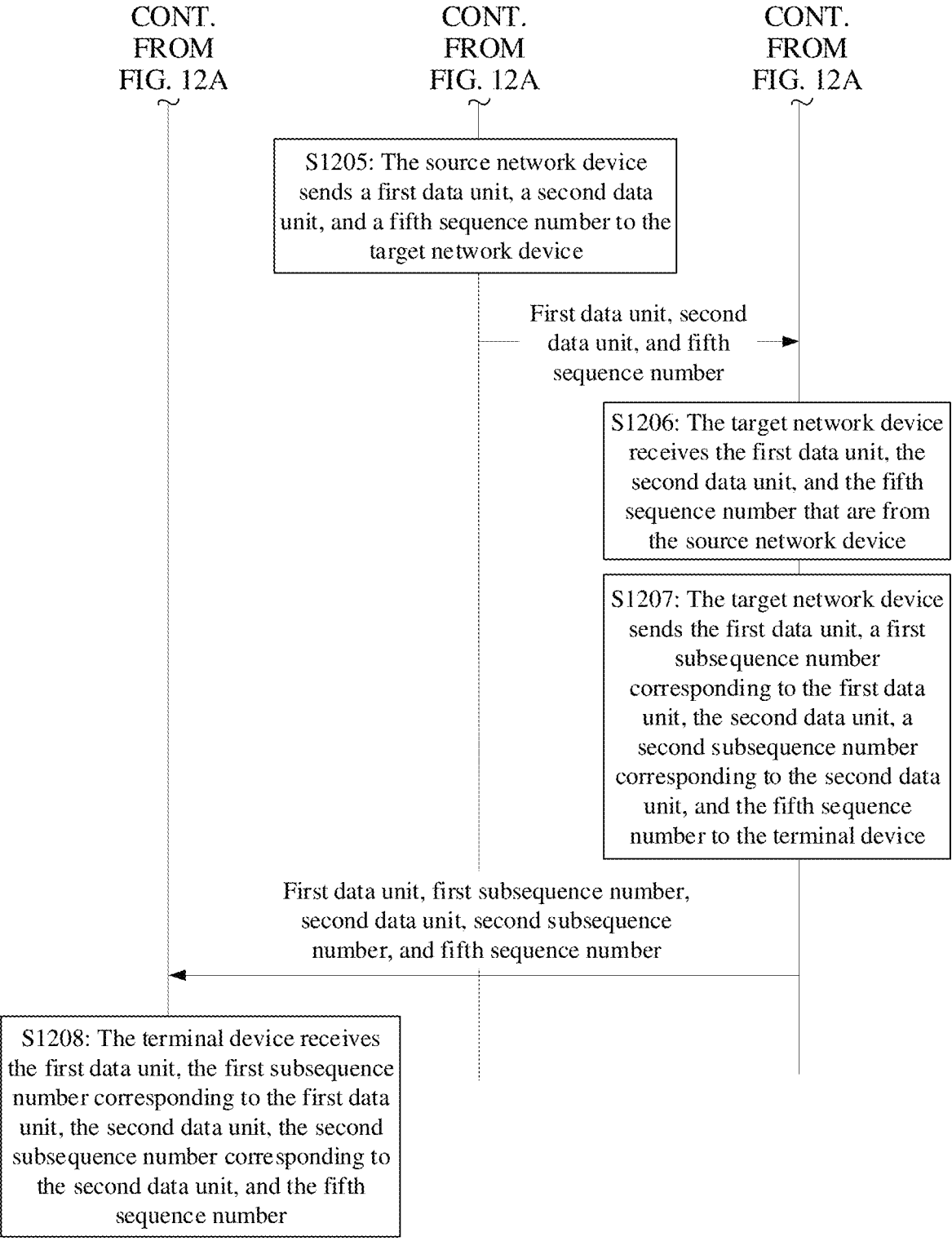

CONT.
FROM
FIG. 12A

CONT.
FROM
FIG. 12A

CONT.
FROM
FIG. 12A

S1205: The source network device sends a first data unit, a second data unit, and a fifth sequence number to the target network device First data unit, second data unit, and fifth sequence number S1206: The target network device receives the first data unit, the second data unit, and the fifth sequence number that are from the source network device S1207: The target network device sends the first data unit, a first subsequence number corresponding to the first data unit, the second data unit, a second subsequence number corresponding to the second data unit, and the fifth sequence number to the terminal device First data unit, first subsequence number, second data unit, second subsequence number, and fifth sequence number S1208: The terminal device receives the first data unit, the first subsequence number corresponding to the first data unit, the second data unit, the second subsequence number corresponding to the second data unit, and the fifth sequence number

FIG. 12B

DATA TRANSMISSION METHOD, APPARATUS, AND SYSTEM

CROSS-REFERENCE TO RELATED APPLICATIONS

This application is a continuation of International Application No. PCT/CN2022/092524, filed on May 12, 2022, which claims priority to Chinese Patent Application No. 202110738628.1, filed on Jun. 30, 2021. The disclosures of the aforementioned applications are hereby incorporated by reference in their entireties.

TECHNICAL FIELD

The embodiments relate to the field of communication technologies and to a data transmission method, an apparatus, and a system.

BACKGROUND

In a new radio (NR) system, a protocol stack between a base station and a terminal device includes the following protocol layers: a service data adaptation protocol (SDAP) layer, a packet data convergence protocol (PDCP) layer, a radio link control (RLC) layer, a media access control (MAC) layer, and a physical (PHY) layer.

Before a data packet is sent, the data packet needs to be processed at an SDAP layer, a PDCP layer, an RLC layer, a MAC layer, and a physical layer in sequence. Finally, the data packet is sent. Correspondingly, a receiver side performs reverse processing in a reverse protocol layer order. When a data packet is processed at each protocol layer, a data packet header needs to be added. For example, when a terminal device is handed over from a source base station to a target base station, the source base station needs to forward data of the terminal device to the target base station. When the source base station processes a data packet at the SDAP layer, an SDAP layer packet header is added. Similarly, when the data packet is processed at the PDCP layer, a PDCP layer packet header is added. A size of a packet header is about 6 bytes. Therefore, when a data packet is sent from the source base station to the target base station, packet header overheads are finally increased by about a dozen of bytes. The overheads are relatively high. In addition, in a process of adding a packet header to a data packet, a large quantity of hardware resources need to be consumed, reducing data processing efficiency.

Therefore, how to improve data transmission efficiency and reduce data overheads is an urgent problem to be resolved.

SUMMARY

The embodiments include a data transmission method, an apparatus, and a system, to improve data transmission efficiency and reduce data overheads.

According to a first aspect, the embodiments provide a data transmission method. The method is applicable to a scenario in which a source network device forwards data of a terminal device to a target network device in a terminal device handover process. An execution body of the method is the source network device or a module in the source network device. An example in which the source network device is the execution body is used for description herein. The method includes: a source network device performs cascading processing on at least two data units to obtain a first data packet. The source network device may send the first data packet to a target network device through a first tunnel. Data included in the at least two data units belongs to a same radio bearer or quality of service flow of a terminal device, and the first data packet is a packet data convergence protocol (PDCP) layer data packet or a service data adaptation protocol (SDAP) layer data packet.

According to the foregoing method, a plurality of data units is cascaded to obtain one data packet, so that header overheads of the cascaded data packet can be reduced, lossless handover under a cascading function can be implemented, thereby obtaining a cascading gain.

In a possible implementation, the source network device may further send first information to the target network device through the first tunnel, where the first information indicates that the first data packet is a cascaded data packet.

In a possible implementation, the source network device may further send a second data packet and second information to the target network device through the first tunnel, where the second information indicates that the second data packet is a non-cascaded data packet, and data in the second data packet and data in the first data packet belong to a same radio bearer or quality of service flow of the terminal device.

In the foregoing implementation, the cascaded data packet and the non-cascaded data packet of the same radio bearer or quality of service flow are forwarded through a public tunnel (for example, the first tunnel), and a type of the data packet (the cascaded data packet or the non-cascaded data packet) is additionally indicated. In this way, header overheads of the cascaded data packet can be reduced, and lossless handover under a cascading function can be implemented.

In a possible implementation, the source network device may further send a second data packet to the target network device through a second tunnel, where the second data packet is a non-cascaded data packet, and data in the second data packet and data in the first data packet belong to a same radio bearer or quality of service flow of the terminal device.

In the foregoing implementation, the cascaded data packet and the non-cascaded data packet are forwarded through different tunnels. In this way, header overheads of the cascaded data packet can be reduced, and overheads caused by distinguishing between different types of data packets can be reduced, thereby implementing lossless handover under a cascading function.

In a possible implementation, the source network device may further receive address information of the second tunnel from the target network device.

In a possible implementation, the source network device may further receive address information of the first tunnel from the target network device.

In a possible implementation, a data size of the first data packet is X, a maximum value of X is less than or equal to a smaller value of a first maximum data volume and a second maximum data volume, or a maximum value of X is less than or equal to a smallest value of a first maximum data volume, a second maximum data volume, and a third maximum data volume, and X is a number greater than 0. The first maximum data volume is a maximum data volume that is of a cascaded data packet and that is supported by the source network device, the second maximum data volume is a maximum data volume that is of a cascaded data packet and that is supported by the target network device, and the third maximum data volume is a maximum data volume that is of a cascaded data packet and that is supported by the terminal device.

According to the foregoing method, the maximum value of the data volume of the first data packet is limited to being less than or equal to the first maximum data volume or the second maximum data volume. In this way, that the cascaded data packet sent by the source network device is beyond a processing capability of the target network device is avoided, processing efficiency of the cascaded data packets is improved, and data transmission efficiency is improved.

In a possible implementation, Y data units are cascaded in the first data packet, a maximum value of Y is less than or equal to a smaller value of a first maximum value and a second maximum value, or a maximum value of Y is less than or equal to a smallest value of a first maximum value, a second maximum value, and a third maximum value, and Y is an integer greater than 1. The first maximum value is a maximum value that is of a quantity of data units cascaded to obtain a cascaded data packet and that is supported by the source network device, the second maximum value is a maximum value that is of a quantity of data units cascaded to obtain a cascaded data packet and that is supported by the target network device, and the third maximum value is a maximum value that is of a quantity of data units cascaded to obtain a cascaded data packet and that is supported by the terminal device.

According to the foregoing method, the maximum value of the quantity of data units cascaded to obtain the first data packet is limited to being less than or equal to the first maximum value or the second maximum value. In this way, that the cascaded data packet sent by the source network device is beyond a processing capability of the target network device is avoided, processing efficiency of the cascaded data packets is improved, and data transmission efficiency is improved.

In a possible implementation, the source network device may further send a third data packet to the terminal device, where the third data packet is obtained by cascading M data units, M is an integer greater than 1, and data in the third data packet and the data in the first data packet belong to a same radio bearer or quality of service flow of the terminal device.

In a possible implementation, a data size of the third data packet is P, a maximum value of P is less than or equal to a smaller value of the first maximum data volume and the third maximum data volume, or a maximum value of P is less than or equal to the smallest value of the first maximum data volume, the second maximum data volume, and the third maximum data volume, and P is a real number greater than 0. The first maximum data volume is the maximum data volume that is of a cascaded data packet and that is supported by the source network device, the second maximum data volume is the maximum data volume that is of a cascaded data packet and that is supported by the target network device, and the third maximum data volume is the maximum data volume that is of a cascaded data packet and that is supported by the terminal device.

In a possible implementation, a maximum value of M is less than or equal to a smaller value of the first maximum value and the third maximum value, or a maximum value of M is less than or equal to the smallest value of the first maximum value, the second maximum value, and the third maximum value.

The first maximum value is the maximum value that is of a quantity of data units cascaded to obtain a cascaded data packet and that is supported by the source network device, the second maximum value is the maximum value that is of a quantity of data units cascaded to obtain a cascaded data packet and that is supported by the target network device, and the third maximum value is the maximum value that is of a quantity of data units cascaded to obtain a cascaded data packet and that is supported by the terminal device.

In a possible implementation, the source network device may further receive at least one of the second maximum data volume and the second maximum value from the target network device.

In a possible implementation, the source network device may further receive sequence number quantity information from the target network device, where the sequence number quantity information indicates a quantity of requested sequence numbers, and the sequence number identifies a data packet.

In a possible implementation, a sequence number value range is sent to the target network device, where the sequence number value range includes at least one sequence number.

According to a second aspect, the embodiments provide a data transmission method. The method is applicable to a scenario in which a source network device forwards data of a terminal device to a target network device in a terminal device handover process. An execution body of the method is the target network device or a module in the target network device. An example in which the target network device is the execution body is used for description herein. The method includes: a target network device receives a first data packet from a source network device through a first tunnel, where the first data packet is a data packet obtained by cascading at least two data units, data included in the at least two data units belongs to a same radio bearer or quality of service flow of a terminal device, and the first data packet is a packet data convergence protocol (PDCP) layer data packet or a service data adaptation protocol (SDAP) layer data packet. The target network device sends the first data packet to the terminal device.

In a possible implementation, the target network device may further receive first information from the source network device through the first tunnel, where the first information indicates that the first data packet is a cascaded data packet; and sends the first information to the terminal device.

In a possible implementation, the target network device may further receive a second data packet and second information from the source network device through the first tunnel, where the second information indicates that the second data packet is a non-cascaded data packet, and data in the second data packet and data in the first data packet belong to a same radio bearer or quality of service flow of the terminal device. The target network device sends the second data packet and the second information to the terminal device.

In a possible implementation, the target network device may further receive a second data packet from the source network device through a second tunnel, where the second data packet is a non-cascaded data packet, and data in the second data packet and data in the first data packet belong to a same radio bearer or quality of service flow of the terminal device; and send the second data packet to the terminal device.

In a possible implementation, a data size of the first data packet is X, a maximum value of X is less than or equal to a smaller value of a first maximum data volume and a second maximum data volume, or a maximum value of X is less than or equal to a smallest value of a first maximum data volume, a second maximum data volume, and a third maximum data volume, and X is a real number greater than 0. The first maximum data volume is a maximum data volume that is of a cascaded data packet and that is supported by the source network device, the second maximum data volume is a maximum data volume that is of a cascaded data packet and that is supported by the target network device, and the third maximum data volume is a maximum data volume that is of a cascaded data packet and that is supported by the terminal device.

In a possible implementation, Y data units are cascaded in the first data packet, a maximum value of Y is less than or equal to a smaller value of a first maximum value and a second maximum value, or a maximum value of Y is less than or equal to a smallest value of a first maximum value, a second maximum value, and a third maximum value, and Y is an integer greater than 1. The first maximum value is a maximum value that is of a quantity of data units cascaded to obtain a cascaded data packet and that is supported by the source network device, the second maximum value is a maximum value that is of a quantity of data units cascaded to obtain a cascaded data packet and that is supported by the target network device, and the third maximum value is a maximum value that is of a quantity of data units cascaded to obtain a cascaded data packet and that is supported by the terminal device.

In a possible implementation, the target network device may further receive at least one piece of the following information from the source network device: the first maximum data volume, the third maximum data volume, the first maximum value, and the second maximum value. The first maximum data volume is the maximum data volume that is of a cascaded data packet and that is supported by the source network device, the second maximum data volume is the maximum data volume that is of a cascaded data packet and that is supported by the target network device, the first maximum value is the maximum value that is of a quantity of data units cascaded to obtain a cascaded data packet and that is supported by the source network device, and the second maximum value is the maximum value that is of a quantity of data units cascaded to obtain a cascaded data packet and that is supported by the target network device.

In a possible implementation, the target network device may further receive a plurality of non-cascaded data packets from the source network device, where one non-cascaded data packet includes one data unit. The target network device sends a fourth data packet to the terminal device, where the fourth data packet is obtained by cascading data units of at least two of the plurality of non-cascaded data packets.

In a possible implementation, a data size of the fourth data packet is X2, a maximum value of X2 is less than or equal to a smaller value of the second maximum data volume and the third maximum data volume, or a maximum value of X2 is less than or equal to a smallest value of the first maximum data volume, the second maximum data volume, and the third maximum data volume, and X2 is a number greater than 0.

In a possible implementation, Y2 data units are cascaded in the fourth data packet, a maximum value of Y2 is less than or equal to a smaller value of the second maximum value and the third maximum value, or a maximum value of Y2 is less than or equal to a smallest value of the first maximum value, the second maximum value, and the third maximum value, and Y2 is an integer greater than 1.

In a possible implementation, a sequence number corresponding to the fourth data packet is within a sequence number value range, the sequence number value range includes at least one sequence number, and the sequence number value range is from the source network device.

According to a third aspect, the embodiments provides a data transmission method. The method is applicable to a scenario in which a source network device forwards data of a terminal device to a target network device in a terminal device handover process. An execution body of the method is the source network device or a module in the source network device. An example in which the source network device is the execution body is used for description herein. The method includes: a source network device sends a fifth data packet to a terminal device, where the fifth data packet is obtained by cascading at least two data units, and the at least two data units include a first data unit and a second data unit. If it is determined that the fifth data packet is not successfully received and a connection between the source network device and the terminal device is disconnected, the source network device sends, to a target network device, the first data unit, the second data unit, and a fifth sequence number corresponding to the first data unit and the second data unit. The source network device is a source network device from which the terminal device is handed over, and the target network device is a network device to which the terminal device is handed over.

According to a fourth aspect, the embodiments provide a data transmission method. The method is applicable to a scenario in which a source network device forwards data of a terminal device to a target network device in a terminal device handover process. An execution body of the method is the target network device or a module in the target network device. An example in which the target network device is the execution body is used for description herein. The method includes: a target network device receives a first data unit and a second data unit from a source network device, and a fifth sequence number corresponding to the first data unit and the second data unit. Data in the first data unit and data in the second data unit belong to a same radio bearer or quality of service flow of a terminal device. The source network device is a source network device from which the terminal device is handed over, and the target network device is a network device to which the terminal device is handed over. The target network device determines a first subsequence number of the first data unit and a second subsequence number of the second data unit. The subsequence number indicates a sequence of a data unit, which corresponds to the subsequence number, in at least two data units that correspond to the fifth sequence number. The target network device sends the first data unit, the first subsequence number, the second data unit, the second subsequence number, and the fifth sequence number to the terminal device.

In a possible implementation, the first data unit further includes location indication information, where the location indication information indicates whether the first data unit is a last data unit corresponding to the fifth sequence number.

According to a fifth aspect, the embodiments further provide a communication apparatus. The communication apparatus has a function of implementing the method provided in the first aspect or the third aspect. The communication apparatus may be implemented by hardware, or may be implemented by hardware executing corresponding software. The hardware or the software includes one or more modules or units corresponding to the foregoing function.

In a possible implementation, the communication apparatus includes a processor. The processor is configured to support the communication apparatus to perform a corresponding function of a source network device in the foregoing methods. The communication apparatus may further include a memory. The memory may be coupled to the processor, and the memory stores program instructions and data that are necessary for the communication apparatus.

Optionally, the communication apparatus further includes an interface circuit. The interface circuit is configured to support communication between the communication apparatus and a device such as a terminal device.

In a possible implementation, the communication apparatus includes corresponding functional modules that are separately configured to implement steps in the foregoing methods. The function may be implemented by the hardware, or may be implemented by the hardware executing the corresponding software. The hardware or the software includes the one or more modules corresponding to the foregoing function.

In a possible implementation, a structure of the communication apparatus includes a processing unit and a communication unit. The units may perform corresponding functions in the foregoing method examples. For details, refer to the descriptions in the method provided in the first aspect or the third aspect. Details are not described herein again.

According to a sixth aspect, the embodiments further provide a communication apparatus. The communication apparatus has a function of implementing the method provided in the second aspect or the fourth aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus to perform a corresponding function of a target network device in the methods. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a terminal device.

In a possible implementation, the communication apparatus includes corresponding functional modules that are separately configured to implement steps in the foregoing methods. The function may be implemented by the hardware, or may be implemented by the hardware executing the corresponding software. The hardware or the software includes the one or more modules corresponding to the foregoing function.

In a possible implementation, a structure of the communication apparatus includes a processing unit and a communication unit. The units may perform corresponding functions in the foregoing method examples. For details, refer to the descriptions in the method provided in the second aspect or the fourth aspect. Details are not described herein again.

According to a seventh aspect, a communication apparatus is provided, including a processor and a memory. The memory stores a computer program or instructions. The processor is configured to execute the computer program or instructions stored in the memory, to implement the method in the first aspect, the third aspect, or any possible implementation of any one of the first aspect or the third aspect.

According to an eighth aspect, a communication apparatus is provided, including a processor and a memory. The memory stores a computer program or instructions. The processor is configured to execute the computer program or instructions stored in the memory, to implement the method in the second aspect, the fourth aspect, or any possible implementation of any one of the second aspect or the fourth aspect.

According to a ninth aspect, a communication apparatus is provided, including a processor and an interface circuit, and optionally, further including a memory. The memory stores a computer program or instructions. The interface circuit is configured to: receive a signal from another communication apparatus different from the communication apparatus and transmit the signal to the processor, or send a signal from the processor to another communication apparatus different from the communication apparatus. The processor is configured to execute the computer program or instructions stored in the memory, to implement the method in the first aspect, the third aspect, or any possible implementation of any one of the first aspect or the third aspect.

According to a tenth aspect, a communication apparatus is provided, including a processor and an interface circuit, and optionally, further including a memory. The memory stores a computer program or instructions. The interface circuit is configured to: receive a signal from another communication apparatus different from the communication apparatus and transmit the signal to the processor, or send a signal from the processor to another communication apparatus different from the communication apparatus. The processor is configured to execute the computer program or instructions stored in the memory, to implement the method in the second aspect, the fourth aspect, or any possible implementation of any one of the second aspect or the fourth aspect.

According to an eleventh aspect, a non-transitory computer-readable storage medium is provided. The non-transitory computer-readable storage medium stores a computer program or instructions. When the computer program or instructions are run on a computer, the computer is enabled to implement the method in any one of the first aspect to the fourth aspect and any possible implementation of any one of the first aspect to the fourth aspect.

According to a twelfth aspect, a computer program product storing non-transitory computer-readable instructions is provided. When the non-transitory computer-readable instructions are run on a computer, the computer is enabled to implement the method in any one of the first aspect to the fourth aspect and any possible implementation of any one of the first aspect to the fourth aspect.

According to a thirteenth aspect, a chip is provided. The chip includes a processor, and may further include a memory, configured to execute a computer program or instructions stored in the memory, so that a chip system implements the method in any one of the first aspect to the fourth aspect and any possible implementation of any one of the first aspect to the fourth aspect.

According to a fourteenth aspect, a communication apparatus is provided, including a processor and an interface circuit. The interface circuit is configured to: receive a signal from another communication apparatus different from the communication apparatus and transmit the signal to the processor, or send a signal from the processor to another communication apparatus different from the communication apparatus. The processor is configured to execute a computer program or instructions, to implement the method in the first aspect, the third aspect, or any possible implementation of any one of the first aspect or the third aspect.

According to a fifteenth aspect, a communication apparatus is provided, including a processor and an interface circuit. The interface circuit is configured to: receive a signal from another communication apparatus different from the communication apparatus and transmit the signal to the processor, or send a signal from the processor to another communication apparatus different from the communication apparatus. The processor is configured to execute a computer program or instructions, to implement the method in the second aspect, the fourth aspect, or any possible implementation of any one of the second aspect or the fourth aspect.

According to a sixteenth aspect, a communication apparatus is provided, including modules configured to implement the method in the first aspect, the third aspect, or any possible implementation of any one of the first aspect or the third aspect.

According to a seventeenth aspect, a communication apparatus is provided, including modules configured to implement the method in the second aspect, the fourth aspect, or any possible implementation of any one of the second aspect or the fourth aspect.

According to an eighteenth aspect, a communication system is provided. The system includes the apparatus (for example, a source network device) according to the fifth aspect and the apparatus (for example, a target network device) according to the sixth aspect.

BRIEF DESCRIPTION OF DRAWINGS

FIG. 6A and FIG. 6B are a schematic diagram of a frame format according to an embodiment;

FIG. 7(a) is a schematic diagram of a structure of a cascaded data packet according to an embodiment;

FIG. 7(b) is a schematic diagram of a structure of a cascaded data packet according to an embodiment;

FIG. 12A and FIG. 12B are a schematic flowchart of a data transmission method according to an embodiment;

DETAILED DESCRIPTION OF EMBODIMENTS

The following describes embodiments in detail with reference to the accompanying drawings.

The solutions in embodiments may be applied to various communication systems, for example, a long term evolution (LTE) system, an NR system, and a next generation communication system. This is not limited herein.

In embodiments, a terminal device may be a device having a wireless transceiver function or a chip that can be disposed in any device. The terminal device may also be referred to as user equipment (UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments may be a mobile phone, a tablet computer (pad), a computer with a wireless transceiver function, a virtual reality (VR) terminal, an augmented reality (AR) terminal, a wireless terminal in industrial control, a wireless terminal in self driving, or the like.

In embodiments, a network device may be a wireless access device in various standards. For example, the network device may be a next generation NodeB (gNB) in an NR system, may be an evolved nodeB (eNB), a radio network controller (RNC), a nodeB (NB), a base station controller (BSC), a base transceiver station (base transceiver station, BTS), a home base station (for example, a home evolved NodeB or a home NodeB, HNB), a baseband unit (BBU), or an access point (AP), a wireless relay node, a wireless backhaul node, or a transmission point (transmission and reception point, TRP, or transmission point, TP) in a wireless fidelity (Wi-Fi) system. Alternatively, the network device may be a gNB or a transmission point in a 5G (NR) system, one antenna group or a group of antenna panels (including a plurality of antenna panels) of a base station in the 5G system, or may be a network node that forms a gNB or a transmission point, for example, a baseband unit (BBU), or a DU in a central unit-distributed (CU-DU) architecture, or the like. The network device may alternatively be a server, a wearable device, a vehicle-mounted device, or the like. For example, a network device in a vehicle to everything (V2X) technology may be a roadside unit (RSU).

Figure 1:
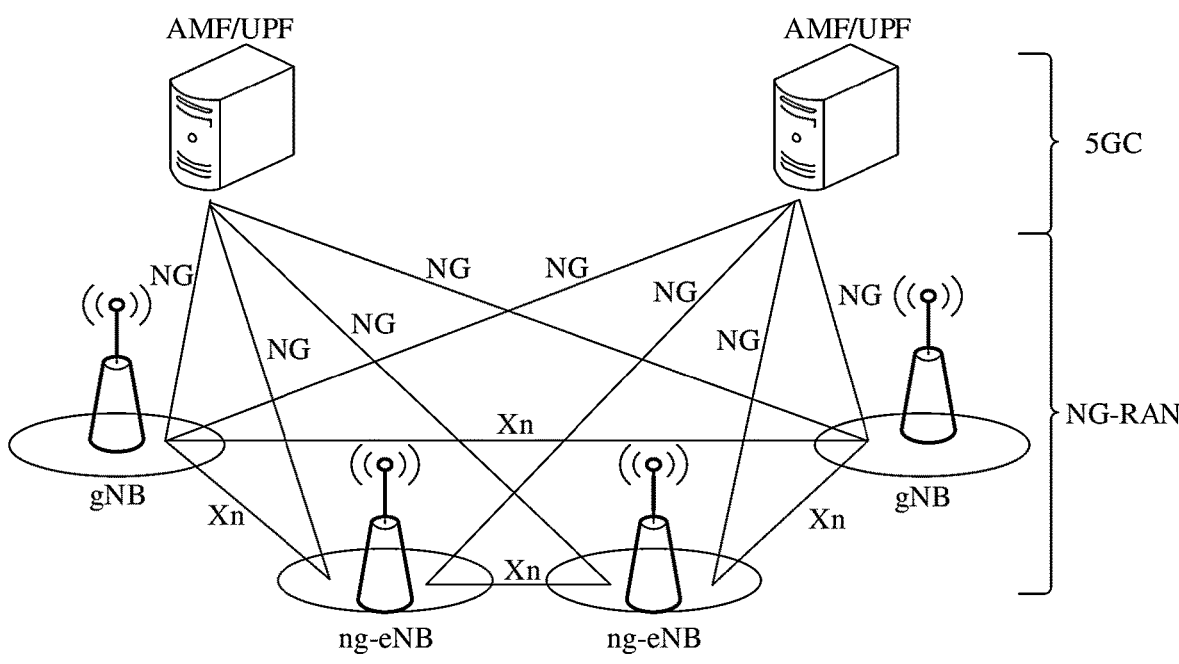
FIG. 1 is a schematic diagram of a network architecture to which embodiments are applicable.

For ease of understanding of embodiments, a communication system shown in FIG. 1 is first used as an example to describe in detail a communication system to which embodiments are applicable. FIG. 1 is a schematic diagram of a network architecture to which embodiments are applicable. As shown in FIG. 1, the network architecture includes a 5G core network (5GC) and a 5G radio access network (NG-RAN). Network communication may be performed between the 5G radio access network and the 5G core network. Nodes in the NG-RAN include a gNB and a next generation eNB (ng-eNB). The gNB is an endpoint that provides user plane and control plane protocols of an NR system, and the ng-eNB is an endpoint that provides user plane and control plane protocol stacks of an E-UTRAN. In addition, an Xn interface is used for connection between the gNB and the gNB, between the gNB and the ng-eNB, and between the ng-eNB and the ng-eNB. The gNB and the ng-eNB are connected to an access and mobility management function (AMF) through an NG-C interface. The gNB and the ng-eNB are connected to a user plane function (user plane function, UPF) through an NG-U interface.

FIG. 1 is merely an example. The embodiments may be further applied to another type of network architecture. Examples are not described one by one herein.

Figure 2:
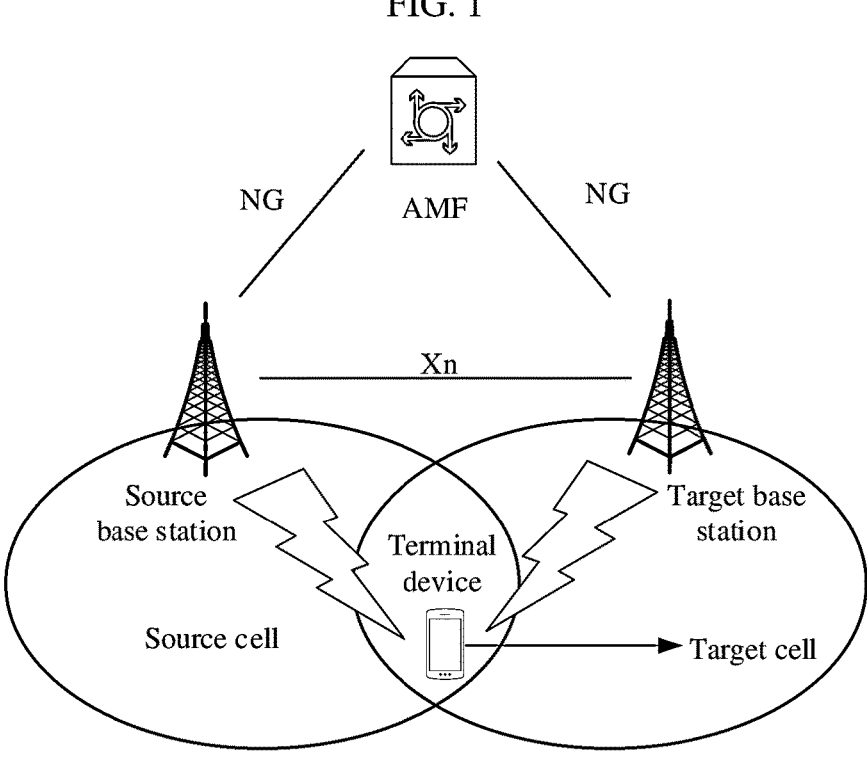
FIG. 2 is a schematic diagram of handover according to an embodiment.

The embodiments may be applied to a scenario in which a terminal device is handed over from a source cell to a target cell, and may be further applied to an Xn handover scenario. FIG. 2 is a schematic diagram of handover according to an embodiment. During Xn handover, a target base station to which the target cell belongs and a source base station to which the source cell belongs are in a same AMF region, and there is an Xn interface between the source base station and the target base station.

Xn handover may be classified into two types: dual active protocol stack (DAPS) handover (handover with DAPS) and non-DAPS handover (handover with non-DAPS). During the non-DAPS handover, after receiving a radio resource control (RRC) message and performing the handover, the terminal device immediately releases a source base station connection (source link). During the DAPS handover, after receiving the RRC message and performing the handover, the terminal device maintains the source base station connection, and releases the source base station connection after successfully accessing the target base station (that is, establishing a target base station connection (target link)).

Figure 3:
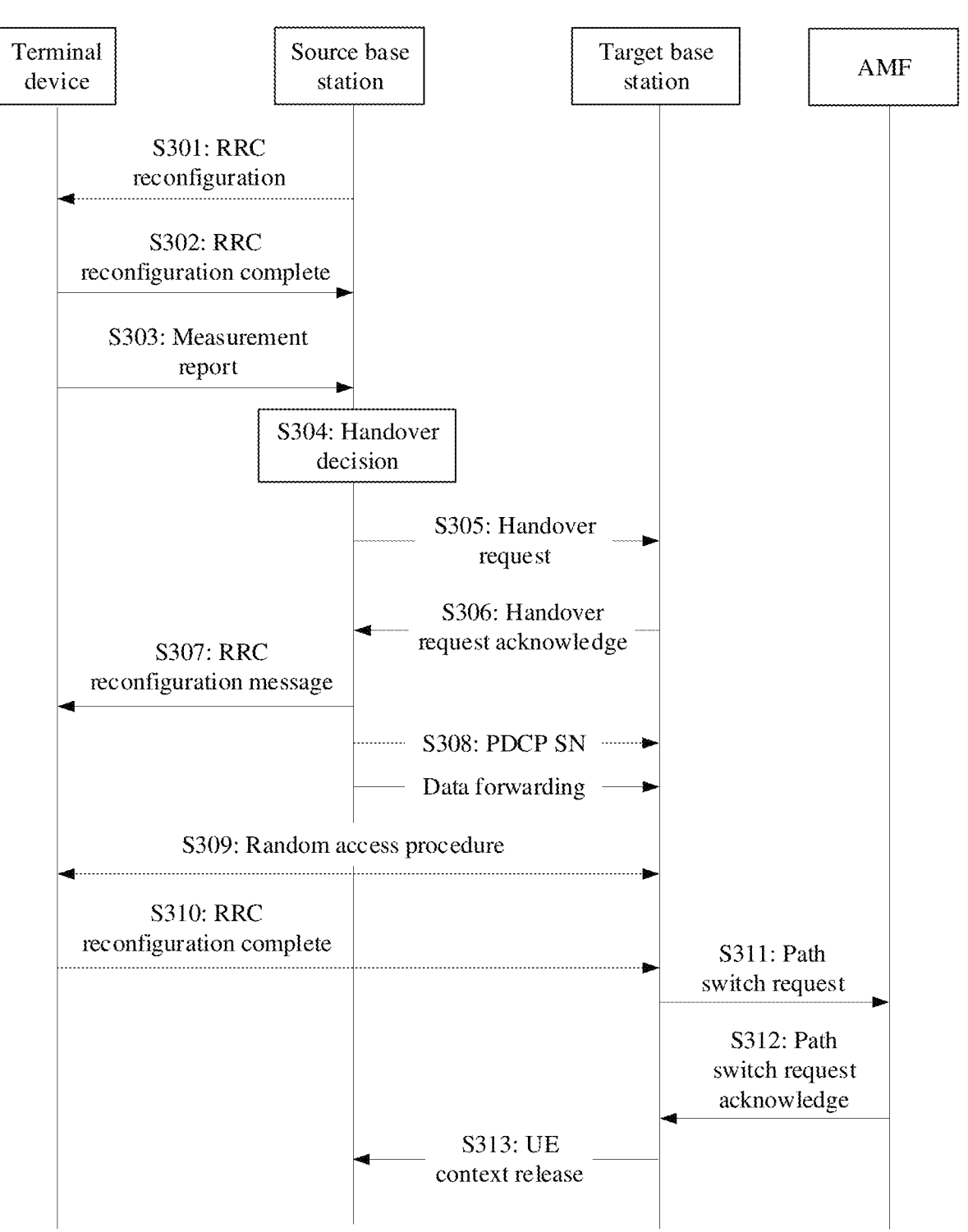
FIG. 3 is a schematic diagram of an Xn handover process according to an embodiment.

FIG. 3 is a schematic diagram of an Xn handover process according to an embodiment. The Xn handover process may include the following process.

S301: A source base station sends an RRC reconfiguration message to a terminal device.

The RRC reconfiguration message is used to deliver measurement control to the terminal device, including a measurement object (intra-frequency/inter-frequency), a measurement report configuration, and the like.

S302: The terminal device returns an RRC reconfiguration complete message to the source base station.

S303: The terminal device sends a measurement report to the source base station.

The terminal device performs measurement based on the received measurement control, to obtain a measurement result. After determining that a handover condition is met, the terminal device sends the measurement result to the source base station by using the measurement report.

S304: After receiving the measurement report, the source base station makes a handover decision based on the measurement result.

In a handover decision process, the source base station determines a target base station.

S305: The source base station sends, through an Xn link, a handover request (handover request) to a target base station in which a selected target cell is located, to initiate the handover request.

S306: The target base station sends handover request acknowledge (handover request acknowledge) to the source base station.

After receiving the handover request, the target base station performs admission control, and allocates a terminal device instance and transmission resources after the admission is allowed.

S307: The source base station sends an RRC reconfiguration message to the terminal device.

The RRC reconfiguration message indicates the terminal device to be handed over to the target cell of the target base station. During the DAPS handover, the terminal device maintains a connection to a source cell. During the non-DAPS handover, the terminal device immediately disconnects the connection from the source cell.

S308: The source base station sends a PDCP sequence number (SN) to the target base station.

Optionally, in this case, the source base station may forward data of the terminal device to the target base station.

S309: Perform a random access procedure between the terminal device and the target base station.

S310: The terminal device sends the RRC reconfiguration complete message to the target base station. An air interface handover of the terminal device to the target cell is completed.

S311: The target base station sends a path switch request message to an AMF, to notify the terminal device that a serving cell has been changed, where the message carries information such as a target cell identifier.

S312: The AMF sends a path switch request acknowledge (path switch request acknowledge) message to the target base station.

S313: The target base station sends a UE context release (UE CONTEXT RELEASE) message to the source base station.

After receiving the UE context release message, the source base station releases the connection to the terminal device.

Figure 4:
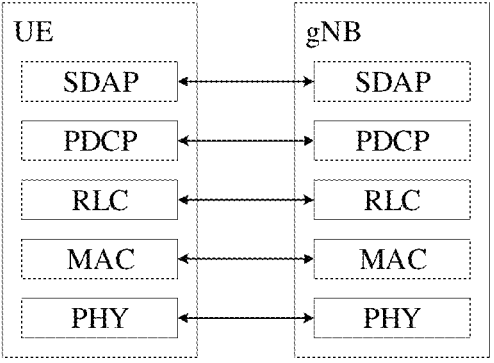
FIG. 4 is a schematic diagram of a structure of a protocol stack according to an embodiment.

In the embodiments, a structure of a protocol stack between a terminal device and a network device may be shown in FIG. 4 with reference to the foregoing description. In FIG. 4, an architecture of a protocol stack of a 5G system is used as an example for description. The protocol stack of the 5G system may include an SDAP layer, a PDCP layer, a radio link control (RLC) layer, and a media access control (MAC) layer. It may be understood that during specific implementation, any protocol layer may include at least one entity configured to implement some or all functions of a current protocol layer. This is not limited. The PDCP layer is used as an example. A PDCP entity is located at the PDCP layer, and each PDCP entity may carry data of one radio bearer (radio bearer, RB), for example, a signaling radio bearer (SRB) for transmitting signaling data and a data radio bearer (DRB) for transmitting service data. Generally, a functional entity set of a same radio bearer includes one PDCP entity, at least one RLC entity corresponding to the PDCP entity, at least one MAC entity corresponding to the at least one RLC entity, and at least one PHY entity corresponding to the at least one MAC entity.

A transmit end may process an internet protocol (IP) data packet in an order of the SDAP layer, the PDCP layer, the RLC layer, the MAC layer, and then the PHY layer, and finally deliver the internet protocol data packet to the PHY layer to perform a sending operation. At each protocol layer, the protocol layer entity may perform processing such as adding a corresponding data packet header (or referred to as a frame header) to a data packet (that is, a local-layer service data unit (SDU), or referred to as an upper-layer protocol data unit (PDU)) transferred by an upper layer, to obtain a PDU of the current protocol layer. A peer layer of a peer device may remove the packet header of the PDU of the current protocol layer and parse the PDU of the current protocol layer.

For example, in the 5G system, an example in which the transmit end is UE and a receive end is a gNB is used. When the IP data packet arrives at an SDAP layer of the UE, an SDAP entity located at the SDAP layer uses the IP data packet as an SDAP SDU to perform function processing of the SDAP layer, adds an SDAP header to the IP data packet to form an SDAP PDU, and then delivers the SDAP PDU to a PDCP layer. A PDCP entity located at the PDCP layer uses the SDAP PDU as a PDCP SDU to perform function processing of the PDCP layer, and adds a PDCP header to form a PDCP PDU. The PDCP PDU is successively delivered to an RLC layer and a MAC layer. Similarly, the RLC layer and the MAC layer may separately perform protocol stack processing, add an RLC header and a MAC header, and finally deliver the data packet to the PHY layer to perform the sending operation. Correspondingly, each peer layer of the gNB successively parses the received data packets and delivers the data packets to the upper layer.

Figure 5:
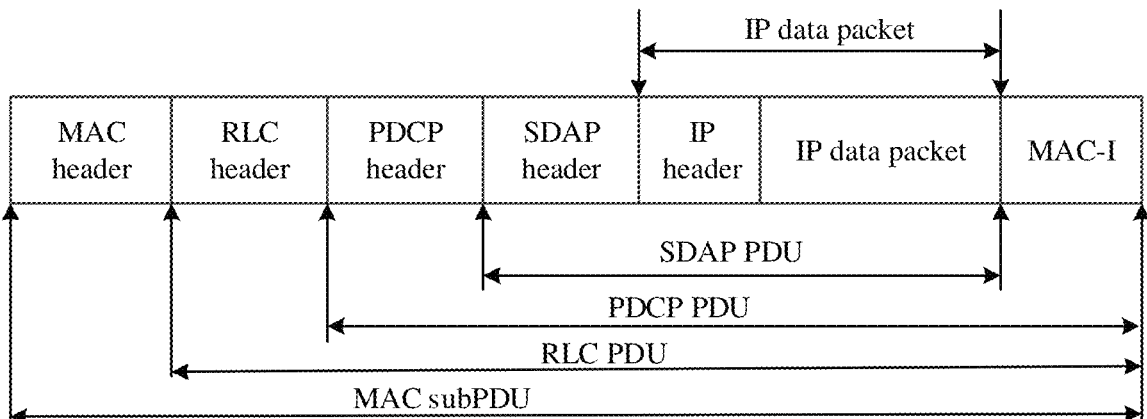
FIG. 5 is a schematic flowchart of a data transmission method according to an embodiment.

For example, after the IP data packet is processed layer by layer, a frame format finally delivered to the PHY layer may be shown in FIG. 5, and includes the MAC header, the RLC header, the PDCP header, the SDAP header, the IP data packet, and message authentication code-integrity (MAC-I). The MAC header, the RLC header, the PDCP header, and the SDAP header include an indication field and the like that are required when each layer of the receive end processes the data packet, and may be collectively referred to as a layer 2 (L2) packet header. A MAC-I field is an integrity check code generated by using an integrity protection function of the PDCP layer.

It can be understood from the foregoing description that a plurality of times of packet header processing and function processing of the protocol layer need to be performed on each IP data packet. When a data transmission rate is relatively large or a data transmission amount is relatively large, encryption, decryption and/or integrity protection function and the like need to be performed on each IP data packet at the PDCP layer, and a requirement on data packet processing capabilities of the terminal device and the base station are relatively high. In addition, after each IP data packet is processed, header overheads of the L2 is relatively large, which degrades transmission performance. Therefore, the embodiments provide a method to resolve the foregoing problems. The following describes the method in detail.

In embodiments, if there are no special statements and logical conflicts, terms and/or descriptions between different embodiments are consistent and may be mutually referenced, and features in different embodiments may be combined based on an internal logical relationship thereof, to form a new embodiment.

It may be understood that various numbers in embodiments are merely used for differentiation for ease of description, and are not used to limit the scope of the embodiments. The sequence numbers of the foregoing processes do not mean execution sequences, and the execution sequences of the processes should be determined based on functions and internal logic of the processes.

A network architecture and service scenarios described in embodiments are intended to describe the solutions in embodiments more clearly, and do not constitute a limitation on the solutions provided in the embodiments. A person of ordinary skill in the art may know that, with evolution of the network architecture and emergence of new service scenarios, the solutions provided in embodiments are also applicable to similar problems.

Figure 6A:
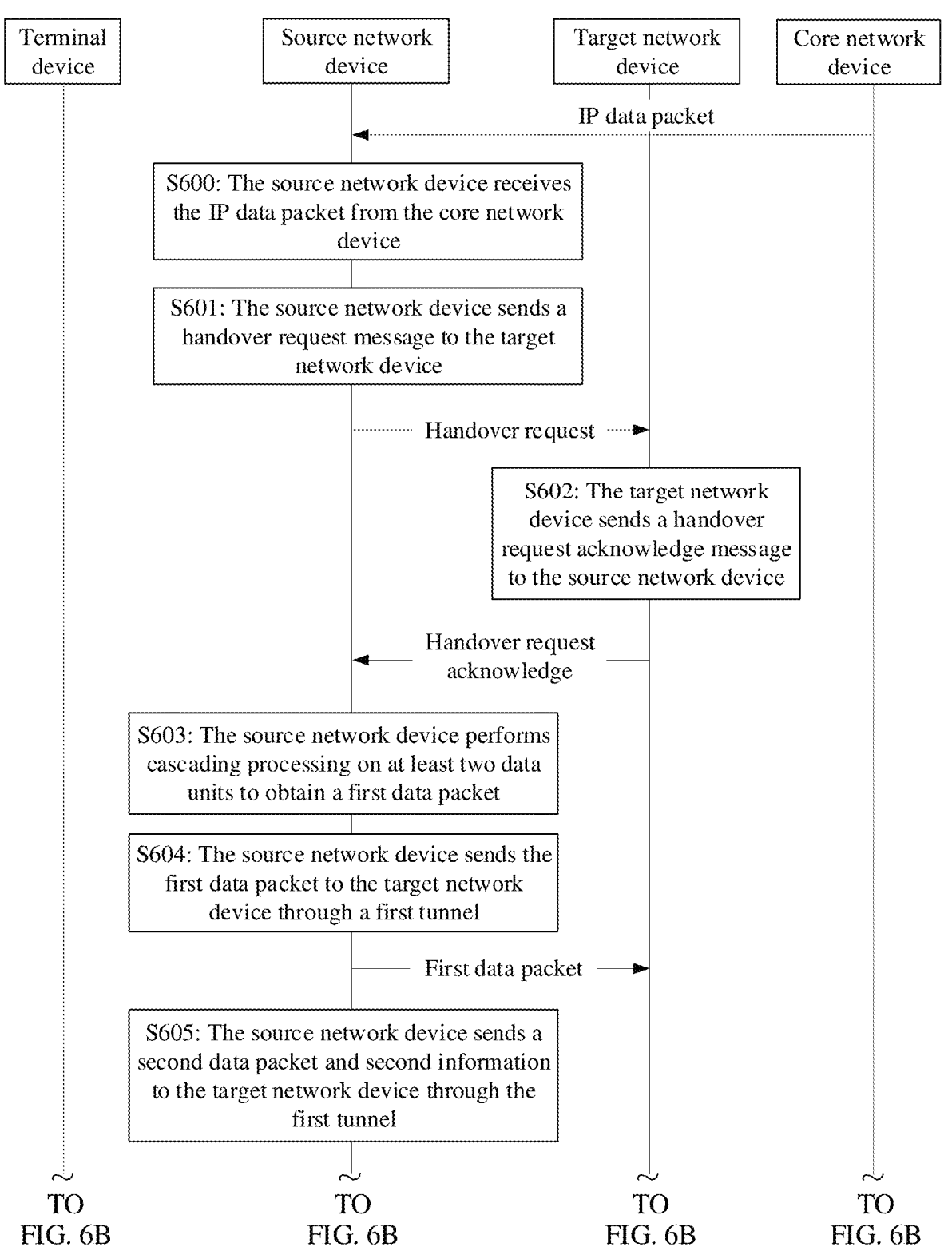

FIG. 6A and FIG. 6B are a schematic flowchart of a data transmission method according to an embodiment. In a procedure shown in FIG. 6A and FIG. 6B, an example in which a terminal device is handed over from a source network device to a target network device is used for description. The method includes the following steps.

S600 (Optional): The source network device receives an IP data packet from a core network device.

The source network device may receive a plurality of IP data packets. The IP data packets are data packets that need to be sent to the terminal device.

For ease of description, in the following description, it is assumed that data in the IP data packets received by the source network device belongs to a same radio bearer or quality of service (QoS) flow of the terminal device.

S601 (Optional): The source network device sends a handover request message to the target network device.

The handover request message requests to hand over the terminal device to the target network device.

When the embodiments are applied to an Xn handover scenario, the source network device may be the source base station in FIG. 2, and the target network device may be the target base station in FIG. 2. Before sending the handover request message, the source network device may further perform another handover procedure. For details, refer to the procedure in FIG. 3. Details are not described herein again.

S602 (Optional): The target network device sends a handover request acknowledge message to the source network device.

In a first possible implementation, the handover request acknowledge message may include address information of a first tunnel. That the first tunnel corresponds to a first radio bearer or a first quality of service flow is used as an example. The first tunnel may be configured to transmit data that belongs to the first radio bearer or the first quality of service flow, and the address information may be an IP address.

In this implementation, one radio bearer or one quality of service flow corresponds to one tunnel, and a cascaded data packet and a non-cascaded data packet of the radio bearer or the quality of service flow are transmitted through a same tunnel. Therefore, for data of a same radio bearer or quality of service flow that belongs to the terminal device, the target network device may allocate a data forwarding address, that is, address information of the tunnel.

In a second possible implementation, the handover request acknowledge message may include the address information of the first tunnel and address information of a second tunnel. The first tunnel is used to transmit the cascaded data packet, and the second tunnel is used to transmit the non-cascaded data packet. Both data in the cascaded data packet and data in the non-cascaded data packet belong to the first radio bearer or the first quality of service flow.

In this implementation, one radio bearer or one quality of service flow corresponds to two tunnels, and the cascaded data packet and the non-cascaded data packet are transmitted through different tunnels. Therefore, for the data of a same radio bearer or quality of service flow that belongs to the terminal device, the target network device may allocate two data forwarding addresses (that is, address information of the tunnels).

In this embodiment, in a process in which the terminal device is handed over to the target network device, in a possible implementation, the source network device may directly forward the IP data packet to the terminal device. In another possible implementation, the source network device may forward the IP data packet to the target network device, and the target network device forwards the IP data packet to the terminal device. In addition, in the handover process, if the source network device does not receive a corresponding acknowledge (ACK) message for the IP data packet sent by the source network device to the terminal device, the IP data packet may be forwarded to the terminal device by using the target network device. The following separately describes a process in which the source network device forwards the IP data packet.

S603: The source network device performs cascading processing on at least two data units to obtain a first data packet.

Data in the at least two data units comes from the core network device, and the data included in the at least two data units belongs to a same radio bearer or quality of service flow of the terminal device.

The source network device may perform cascading processing on the at least two data units at an SDAP layer, or may perform cascading processing on the at least two data units at a PDCP layer.

If a cascading function is performed at the SDAP layer, the first data packet may be an SDAP layer data packet, and the data units may be IP data packets. The SDAP layer data packet herein may be an SDAP PDU for the SDAP layer, and may be a PDCP SDU for the PDCP layer.

An SDAP layer entity of the source network device may cascade the at least two data units (for example, IP data packets) into one SDAP layer data packet (for example, the SDAP PDU). A frame format of a data packet (for example, a MAC subPDU) that is finally delivered to a physical layer may be shown in FIG. 7(*a*), and includes: a MAC header, an RLC header, a PDCP header, a cascaded SDAP header, an IP header 0, an IP data packet 0, an IP header 1, an IP data packet 1, an IP header 2, an IP data packet 2, . . . , and a MAC-I. The cascaded SDAP header may include fields such as a field indicating a quantity of cascaded IP data packets, to indicate a receive end to correctly perform a cascading splitting function.

It can be understood with reference to the foregoing description that, in the SDAP layer data packet in which a plurality of data units are cascaded, the plurality of IP data packets share one SDAP header, and there is no need to configure one SDAP header for each data unit in the SDAP layer data packet. Therefore, header overheads can be reduced.

If the cascading function is performed at the PDCP layer, the first data packet may be a PDCP layer data packet, and the data units may be SDAP layer data packets. The PDCP layer data packet herein may be a PDCP PDU for the PDCP layer, and may be an RLC SDU for an RLC layer.

A PDCP layer entity of the source network device may cascade the at least two data units (for example, PDCP SDUs) into one PDCP layer data packet (for example, the PDCP PDU). A frame format of the data packet (for example, a MAC subPDU) that is finally delivered to the physical layer may be shown in FIG. 7(*b*), and includes: the MAC header, the RLC header, a cascaded PDCP header, an SDAP header, the IP header 0, the IP data packet 0, the SDAP header, the IP header 1, the IP data packet 1, the SDAP header, the IP header 2, the IP data packet 2, . . . , and the MAC-I. The cascaded PDCP header may include fields such as a field indicating the quantity of the cascaded IP data packets, to indicate the receive end to correctly perform the cascading splitting function.

It can be understood with reference to the foregoing description that, in the PDCP layer data packet in which a plurality of data units are cascaded, the plurality of SDAP layer data packets share one PDCP header, and there is no need to configure one PDCP header for each data unit in the PDCP layer data packet. Therefore, header overheads can be reduced.

S604: The source network device sends the first data packet to the target network device through the first tunnel.

In an implementation, a first radio bearer or a first quality of service flow corresponds to one tunnel, that is, corresponds to the first tunnel. If data in the first data packet belongs to the first radio bearer or the first quality of service flow, the source network device may further send first information to the target network device through the first tunnel, where the first information indicates that the first data packet is a cascaded data packet.

In this embodiment, the cascaded data packet is a data packet in which the plurality of IP data packets are cascaded at the SDAP layer. The plurality of IP data packets cascaded in the cascaded data packet share one cascaded SDAP packet header. Alternatively, the cascaded data packet is a data packet in which a plurality of PDCP SDUs are cascaded at the PDCP layer, and the plurality of cascaded PDCP SDUs in the cascaded data packet share one cascaded PDCP packet header.

Correspondingly, the non-cascaded data packet is a data packet including one IP data packet. The non-cascaded data packet does not cascade the plurality of IP data packets at the SDAP layer, and does not cascade the plurality of PDCP SDUs at the PDCP layer.

The first information may be located in the first data packet. For example, the first information may be located in the PDCP header or the SDAP header of the first data packet. Alternatively, the first information and the first data packet may be independent of each other. The first information may be located in a message other than the first data packet, for example, an Xn message. This is not limited in this embodiment.

In this embodiment, the source network device may further allocate a sequence number (SN) to the first data packet. The sequence number may be a PDCP SN. The sequence number may identify the data packet. To ensure that a transmit end sends data in sequence, a PDCP entity of the transmit end maintains an SN for each data packet. When sending the data, the transmit end sends the data in ascending order of the SNs of the data packets. Correspondingly, a PDCP entity of the receive end also maintains a same SN for each data packet, to ensure that the data packets are delivered to an upper layer in ascending order of the SNs of the data packets.

In this implementation, the cascaded data packet and the non-cascaded data packet are transmitted through the first tunnel. Optionally, S605 is further included.

S605: The source network device sends a second data packet and second information to the target network device through the first tunnel.

The second data packet is a non-cascaded data packet, the second information may indicate that the second data packet is the non-cascaded data packet, and data in the second data packet and the data in the first data packet belong to a same radio bearer or quality of service flow of the terminal device.

Figure 8:
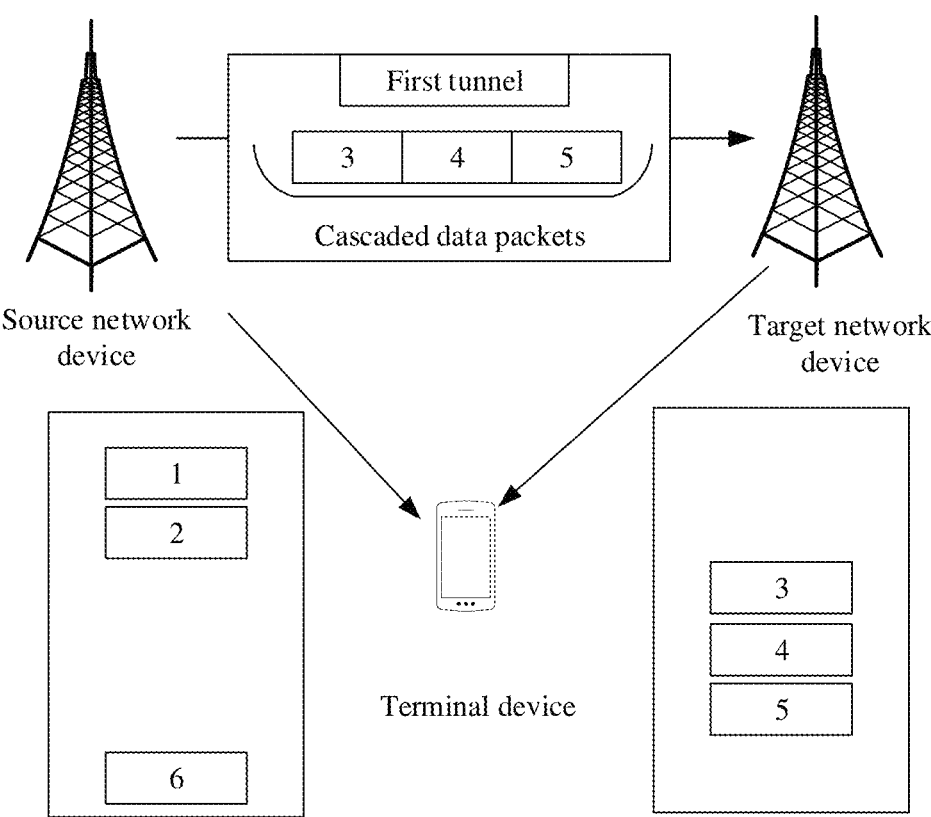
FIG. 8 is a schematic diagram of data transmission in a handover process according to an embodiment.

For example, as shown in FIG. 8, data units obtained by the source network device are respectively a data unit 1 to a data unit 8. The source network device has sent the data unit 1, the data unit 2, and the data unit 6 to the terminal device, and the data unit 3 to the data unit 5 are not sent to the terminal device. In a process in which the terminal device is handed over to the target network device, the source network device may cascade the data unit 3 to the data unit 5 to obtain one data packet, and send the data packet to the target network device through the first tunnel. The target network device forwards, to the terminal device, the data packet in which the data unit 3 to the data unit 5 are cascaded. The source network device may further encapsulate the data unit 7 and the data unit 8 into the non-cascaded data packet, and send the non-cascaded data packet to the target network device through the first tunnel.

In the foregoing implementation, the cascaded data packet and the non-cascaded data packet of the same radio bearer or quality of service flow are forwarded through a public tunnel (for example, the first tunnel), and a type of the data packet (the cascaded data packet or the non-cascaded data packet) is additionally indicated. In this way, header overheads of the cascaded data packet can be reduced, and lossless handover under a cascading function can be implemented.

In another implementation, a first radio bearer or a first quality of service flow corresponds to two tunnels, for example, corresponds to the first tunnel and a second tunnel. If the first tunnel is used to transmit the cascaded data packet, and the second tunnel is used to transmit the non-cascaded data packet, the method may further include S606.

S606 (Optional): The source network device sends the second data packet to the target network device through the second tunnel.

Similarly, the source network device may further allocate the sequence number to the second data packet, and the sequence number may be a PDCP SN. It is assumed that a sequence number of the first data packet is a first SN, the sequence number of the second data packet is a second SN, and the first SN is different from the second SN.

Figure 9:
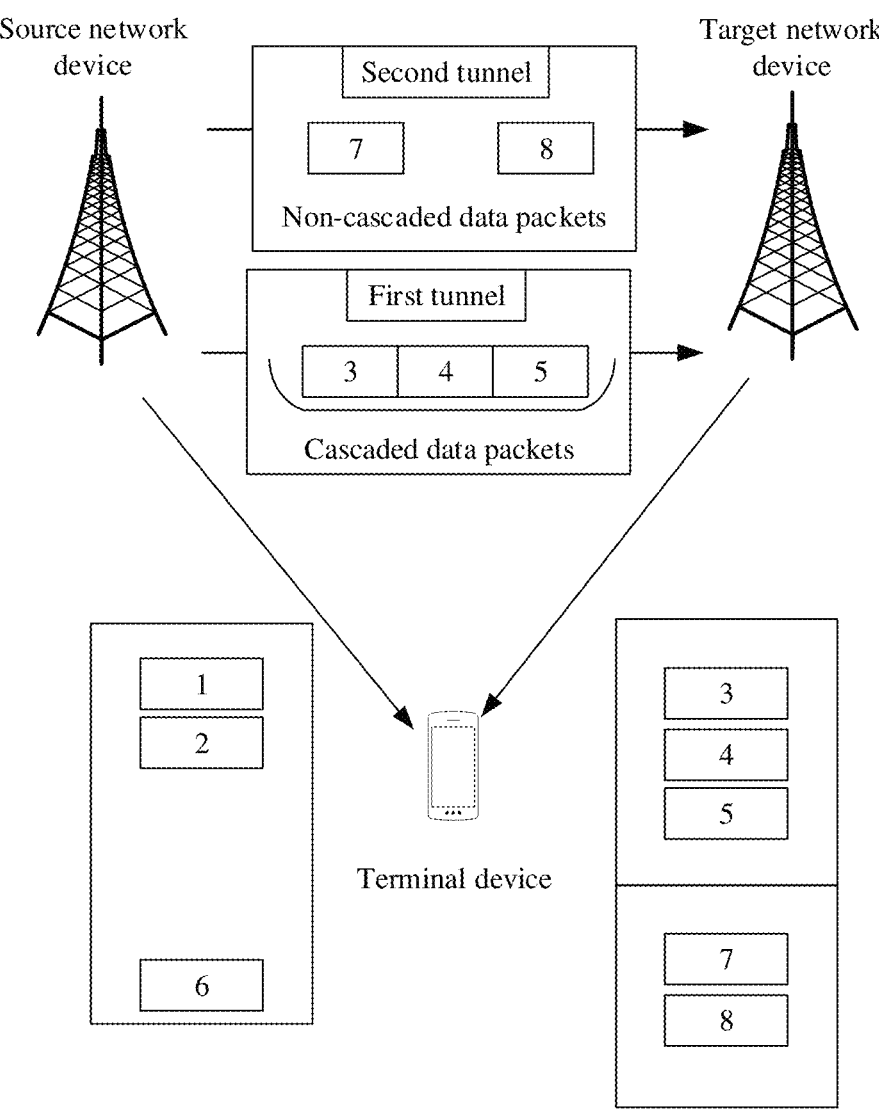
FIG. 9 is a schematic diagram of data transmission in a handover process according to an embodiment.

For example, as shown in FIG. 9, the data units obtained by the source network device are respectively the data unit 1 to the data unit 8. The source network device has sent the data unit 1, the data unit 2, and the data unit 6 to the terminal device, and the data unit 3 to the data unit 5 are not sent to the terminal device. In the process in which the terminal device is handed over to the target network device, the source network device may cascade the data unit 3 to the data unit 5 to obtain one data packet, and send the data packet to the target network device through the first tunnel. The target network device forwards, to the terminal device, the data packet in which the data unit 3 to the data unit 5 are cascaded. The source network device may further encapsulate the data unit 7 and the data unit 8 into the non-cascaded data packet, and send the non-cascaded data packet to the target network device through the second tunnel.

The cascaded data packet and the non-cascaded data packet are forwarded through different tunnels. In this way, header overheads of the cascaded data packet can be reduced, and overheads caused by distinguishing between different types of data packets can be reduced, thereby implementing lossless handover under a cascading function.

S607: The target network device receives the first data packet from the source network device through the first tunnel.

In an implementation, when both the cascaded data packet and the non-cascaded data packet are transmitted through the first tunnel, the target network device may further receive the first information from the source network device through the first tunnel.

In this implementation, the target network device may further receive the second data packet and the second information from the source network device through the first tunnel.

In another implementation, when the cascaded data packet is transmitted through the first tunnel, and the non-cascaded data is transmitted through the second tunnel, the target network device may further receive the second data packet from the source network device through the second tunnel.

S608: The target network device sends the first data packet to the terminal device.

In an implementation, if the target network device receives the first information, the target network device may further send the first information to the terminal device. After receiving the first data packet, the terminal device may perform a de-cascading operation on the first data packet. A specific process is not described again.

Optionally, if the target network device receives the second data packet, the target network device may further send the second data packet to the terminal device.

S609 (Optional): The source network device sends a third data packet to the terminal device.

The third data packet may be a cascaded data packet, or may be a non-cascaded data packet. This is not limited in this embodiment. Data in the third data packet and the data in the first data packet may belong to a same radio bearer or quality of service flow.

In this embodiment, in the handover process, the source network device and the target network device may further negotiate a quantity of data units that may be cascaded in one cascaded data packet and/or a maximum data volume of the cascaded data packet, to avoid that the target network device cannot process the cascaded data packet because capabilities of the source network device and the target network device are inconsistent. For details, refer to the following process.

Figure 10:
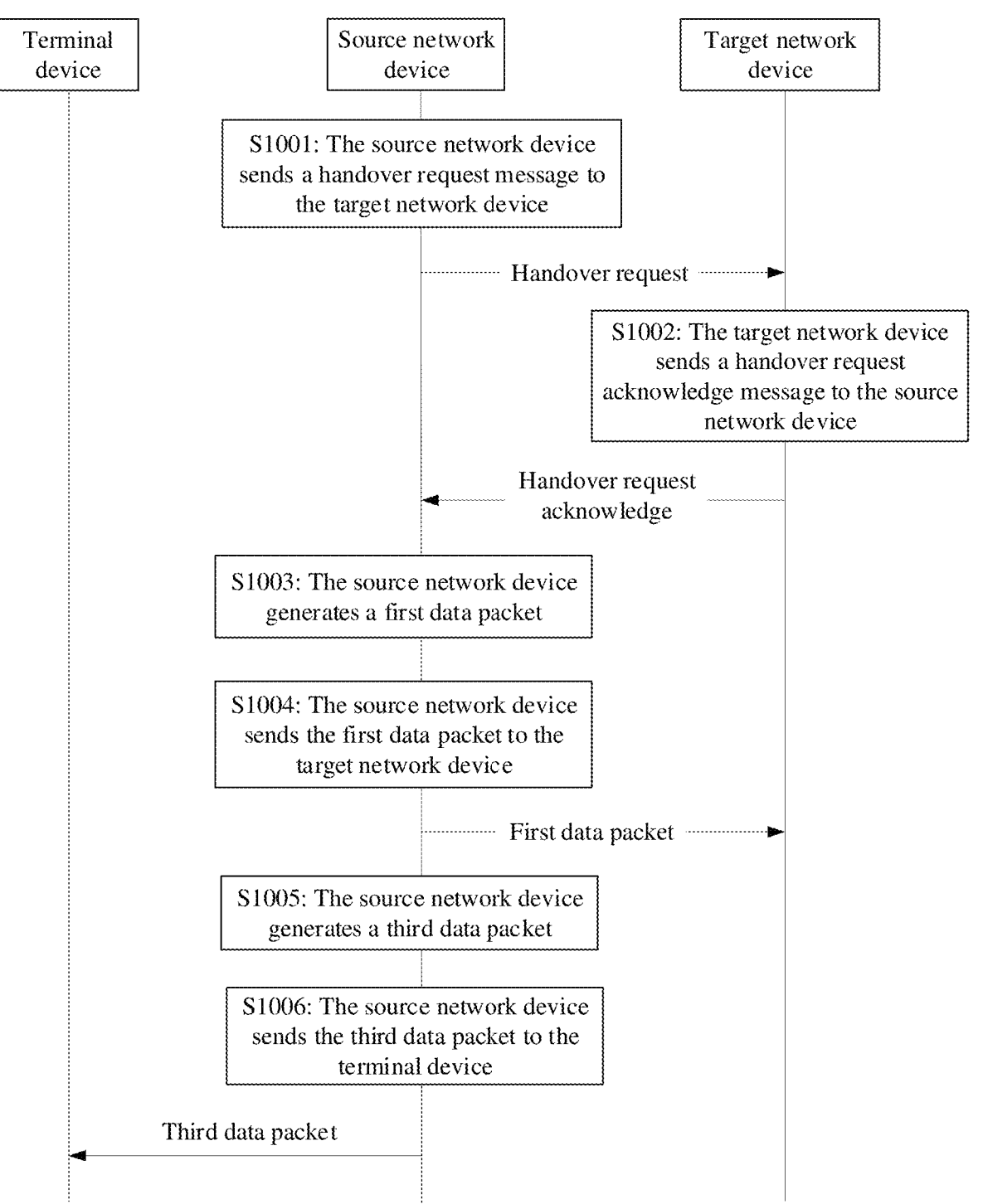
FIG. 10 is a schematic flowchart of a data transmission method according to an embodiment.

FIG. 10 is a schematic flowchart of a data transmission method according to an embodiment. In a procedure shown in FIG. 10, an example in which a terminal device is handed over from a source network device to a target network device is used for description. The method includes the following steps.

S1001 (Optional): The source network device sends a handover request message to the target network device.

The handover request message requests to hand over the terminal device to the target network device. The handover request message may include at least one of first capability information of the source network device and third capability information of the terminal device.

The first capability information may indicate at least one piece of the following information:

a first maximum data volume, for example, a maximum data volume that is of cascaded data packet and that is supported by the source network device, for example, the first maximum data volume is 500 KB;

a first minimum data volume, for example, a minimum data volume that is of a cascaded data packet and that is supported by the source network device, for example, the first minimum data volume is 100 KB;

a first maximum value, for example, a maximum value of a quantity of data units that are cascaded to obtain the cascaded data packet and that are supported by the source network device; and a first minimum value, for example, a minimum value of the quantity of data units that are cascaded to obtain the cascaded data packet and that are supported by the source network device.

The third capability information may indicate at least one piece of the following information:

a third maximum data volume, for example, a maximum data volume that is of a cascaded data packet and that is supported by the terminal device;

a third minimum data volume, for example, a minimum data volume that is of a cascaded data packet and that is supported by the terminal device;

a third maximum value, for example, a maximum value of a quantity of data units that are cascaded to obtain the cascaded data packet and that are supported by the terminal device; and a third minimum value, for example, a minimum value of the quantity of data units that are cascaded to obtain the cascaded data packet and that are supported by the terminal device.

In this embodiment, before sending the handover request message, the source network device may further perform another handover procedure. For details, refer to the procedure in FIG. 3. Details are not described herein again.

S1002 (Optional): The target network device sends a handover request acknowledge message to the source network device.

In addition to the information described in S602, the handover request acknowledge message may further include at least one piece of the following information: second capability information of the target network device; and second duration, where the second duration is used for timing by a cascaded timer, and the source network device performs a cascading operation when the cascaded timer expires.

The second capability information may indicate at least one piece of the following information:

a second maximum data volume, for example, a maximum data volume that is of a cascaded data packet and that is supported by the target network device;

a second minimum data volume, for example, a minimum data volume that is of a cascaded data packet and that is supported by the target network device;

a second maximum value, for example, a maximum value of a quantity of data units that are cascaded to obtain the cascaded data packet and that are supported by the target network device; and a second minimum value, for example, a minimum value of the quantity of data units that are cascaded to obtain the cascaded data packet and that are supported by the target network device.

S1003: The source network device generates a first data packet.

The source network device may determine, based on at least one of the first capability information, the second capability information, and the third capability information, a maximum data volume of the first data packet and/or a maximum value of a quantity of data units included in the first data packet. The source network device may further determine, based on the at least one of the first capability information, the second capability information, and the third capability information, a minimum data volume of the first data packet and/or a minimum value of the quantity of the data units included in the first data packet.

Similarly, the source network device may determine, based on the at least one of the first capability information, the second capability information, and the third capability information, a maximum data volume of a third data packet and/or a maximum value of a quantity of data units included in the third data packet. The source network device may further determine, based on the at least one of the first capability information, the second capability information, and the third capability information, a minimum data volume of the third data packet and/or a minimum value of the quantity of the data units included in the third data packet.

For example, it is assumed that the data size of the first data packet is X, where X is a real number greater than 0.

In a possible implementation, a maximum value of X is less than or equal to a smaller value of the first maximum data volume and the second maximum data volume. In another possible implementation, the maximum value of X is less than or equal to a smallest value of the first maximum data volume, the second maximum data volume, and the third maximum data volume.

For example, the first maximum data volume is 500 KB, the second maximum data volume is 450 KB, and the third maximum data volume is 400 KB. In this case, the maximum value of X may be a smaller value of 500 KB and 450 KB, that is, 450 KB; or the maximum value of X may be a smallest value of 500 KB, 450 KB, and 400 KB, that is, 400 KB.

For example, it is assumed that a quantity of data units cascaded in the first data packet is Y, where Y is an integer greater than 1.

In a possible implementation, a maximum value of Y is less than or equal to a smaller value of the first maximum value and the second maximum value. In another possible implementation, the maximum value of Y is less than or equal to a smallest value of the first maximum value, the second maximum value, and the third maximum value.

For example, the first maximum value is 30, the second maximum value is 25, and the third maximum value is 20. In this case, the maximum value of Y may be a smaller value of 30 and 25, that is, 25. Alternatively, the maximum value of Y may be a smallest value of 30, 25, and 20, that is, 20.

According to the foregoing method, by exchanging capability information, the source network device and the target network device may negotiate a capability of processing the cascaded data packet. In this way, that the cascaded data packet sent by the source network device is beyond a processing capability of the target network device is avoided, processing efficiency of the cascaded data packets is improved, and data transmission efficiency is improved.

In this embodiment, a protocol layer entity of the source network device may perform data packet cascading based on the cascaded timer. This may be the following:

When receiving a first data unit, the source network device starts the cascaded timer, where a timing length of the cascaded timer is specified duration. A cascading function is performed on data units that arrive at an SDAP layer or a PDCP layer within the specified duration, to cascade the data units into a same data packet. The cascaded timer is a timer used to measure the specific duration when the cascading function is performed.

The specified duration may be any one of first duration and second duration. The first duration is duration independently determined by the source network device. The second duration is duration indicated by the target network device to the source network device.

S1004: The source network device sends the first data packet to the target network device.

For a specific process in which the source network device sends the cascaded data packet to the target network device, refer to the procedure shown in FIG. 5. Details are not described herein again.

S1005 (Optional): The source network device generates the third data packet.

An example in which the third data packet is the cascaded data packet is used for description herein. The source network device may determine, based on the at least one of the first capability information, the second capability information, and the third capability information, the maximum data volume of the third data packet and/or the maximum value of the data units included in the third data packet. The source network device may further determine, based on the at least one of the first capability information, the second capability information, and the third capability information, the minimum data volume of the third data packet and/or the minimum value of the data units included in the third data packet.

For example, it is assumed that a data size of the third data packet is P, where P is a real number greater than 0.

In a possible implementation, a maximum value of P is less than or equal to a smaller value of the first maximum data volume and the third maximum data volume. In another possible implementation, the maximum value of P is less than or equal to the smallest value of the first maximum data volume, the second maximum data volume, and the third maximum data volume.

For example, the first maximum data volume is 500 KB, the second maximum data volume is 450 KB, and the third maximum data volume is 400 KB. In this case, the maximum value of P may be a smaller value of 500 KB and 400

KB, that is, 400 KB. Alternatively, the maximum value of P may be the smallest value of 500 KB, 450 KB, and 400 KB, that is, 400 KB.

For example, it is assumed that a quantity of data units cascaded in the third data packet is M, where M is an integer greater than 1.

In a possible implementation, a maximum value of M is less than or equal to a smaller value of the first maximum value and the third maximum value. In another possible implementation, a maximum value of M is less than or equal to the smallest value of the first maximum value, the second maximum value, and the third maximum value.

For example, the first maximum value is 30, the second maximum value is 25, and the third maximum value is 20. In this case, the maximum value of M may be a smaller value of 30 and 20, that is, 20. Alternatively, the maximum value of M may be the smallest value of 30, 25, and 20, that is, 20.

According to the foregoing method, the source network device performs data packet cascading based on capability information of the terminal device, to avoid that the cascaded data packet sent by the source network device is beyond a processing capability of the terminal device, improve processing efficiency of the cascaded data packet, and improve data transmission efficiency.

S1006: The source network device sends the third data packet to the terminal device.

How the source network device sends the cascaded data packet to the terminal device is not limited in this embodiment. Details are not described herein again.

In addition, the source network device may further allocate a sequence number to the third data packet, and the sequence number of the third data packet may be a third SN. It is assumed that a sequence number of the first data packet is a first SN. The first SN is different from the third SN.

In this embodiment, when the source network device sends a non-cascaded data packet to the target network device, the target network device may cascade the non-cascaded data packet, and send the cascaded data packet to the terminal device. To ensure that the sequence number of the data packet is unique, the source network device may allocate the sequence number to the cascaded data packet generated by the target network device. For details, refer to the following process.

Figure 11:
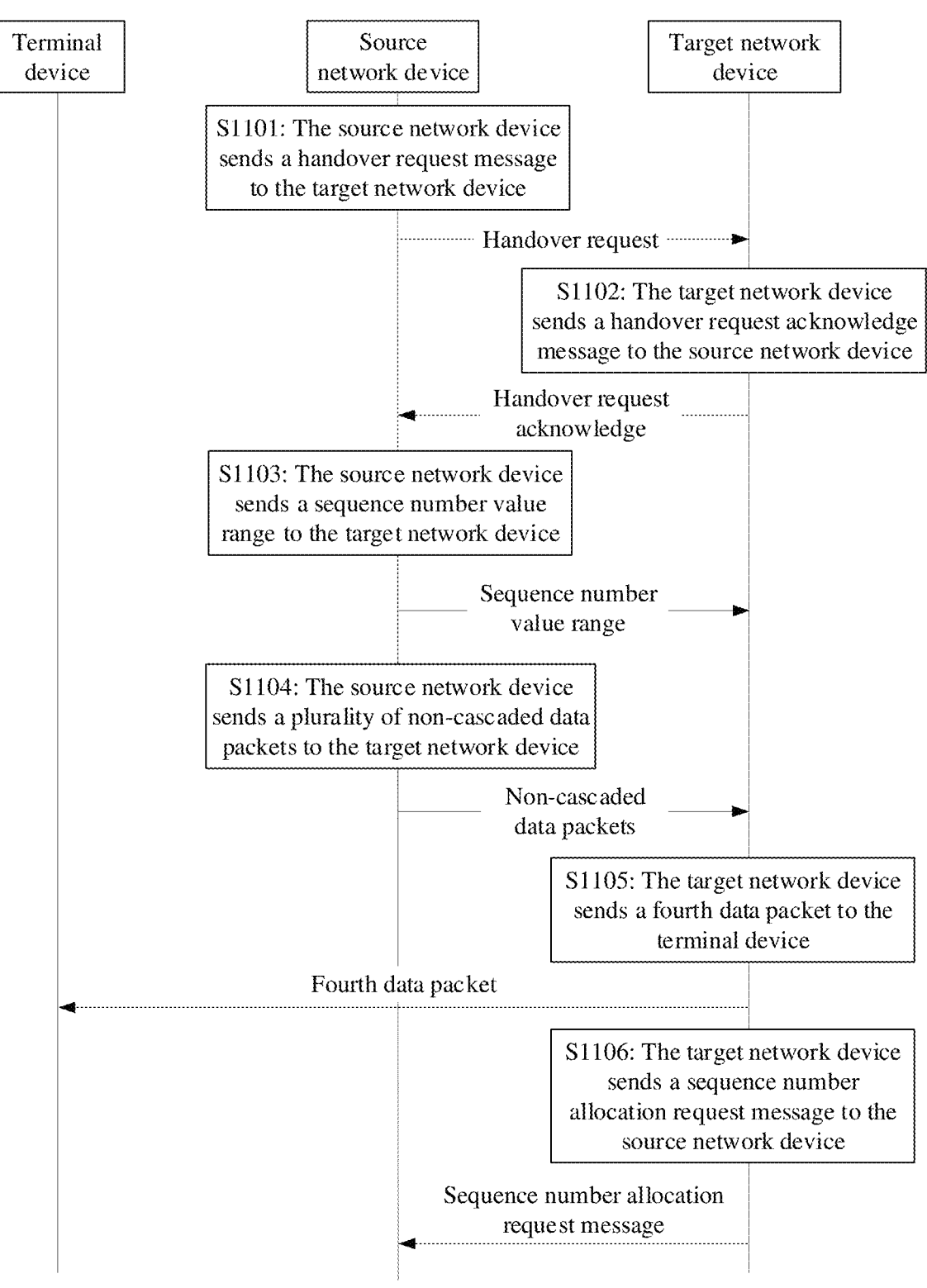
FIG. 11 is a schematic flowchart of a data transmission method according to an embodiment.

FIG. 11 is a schematic flowchart of a data transmission method according to an embodiment. In a procedure shown in FIG. 11, an example in which a terminal device is handed over from a source network device to a target network device is used for description. The method includes the following steps.

S1101 (Optional): The source network device sends a handover request message to the target network device.

The handover request message requests to hand over the terminal device to the target network device. For information included in the handover request message, refer to the description in the procedure shown in FIG. 5 or FIG. 10. Details are not described herein again.

In this embodiment, before sending the handover request message, the source network device may further perform another handover procedure. For details, refer to the procedure in FIG. 3. Details are not described herein again.

S1102 (Optional): The target network device sends a handover request acknowledge message to the source network device.

In addition to the information described in S602 and S1002, the handover request acknowledge message may further include sequence number quantity information. The sequence number quantity information indicates a quantity of requested sequence numbers, and the sequence number identifies a data packet. For example, the sequence number may be a PDCP SN.

S1103: The source network device sends a sequence number value range to the target network device.

The sequence number value range includes at least one sequence number. For example, that the sequence number value range is from 50 to 100 indicates that sequence numbers that may be allocated by the target network device are from 50 to 100. A quantity of sequence numbers included in the sequence number value range may be less than or equal to a quantity of sequence numbers requested by the sequence number quantity information.

In addition, to ensure that a sequence number allocated by the source network device and a sequence number allocated by the target network device do not coincide, the source network device no longer selects the sequence number from the sequence number value range when allocating the sequence number.

S1104: The source network device sends a plurality of non-cascaded data packets to the target network device.

Data in the non-cascaded data packet comes from a core network device. One non-cascaded data packet includes one data unit.

S1105: The target network device sends a fourth data packet to the terminal device. The fourth data packet is obtained by cascading data units of at least two of the plurality of non-cascaded data packets.

A sequence number corresponding to the fourth data packet is within the sequence number value range.

In this embodiment, a data size of the fourth data packet is X2. In a possible implementation, a maximum value of X2 is less than or equal to a smaller value of a second maximum data volume and a third maximum data volume. In another possible implementation, the maximum value of X2 is less than or equal to a smallest value of a first maximum data volume, the second maximum data volume, and the third maximum data volume, where X2 is a real number greater than 0.

Y2 data units are cascaded in the fourth data packet. In a possible implementation, a maximum value of Y2 is less than or equal to a smaller value of a second maximum value and a third maximum value. In another possible implementation, the maximum value of Y2 is less than or equal to a smallest value of a first maximum value, the second maximum value, and the third maximum value, where Y2 is an integer greater than 1.

Optionally, when sequence numbers within the sequence number value range are about to be used up for allocation, the target network device may further request the source network device to allocate a sequence number again. For example, the target network device may perform the following steps.

S1106: The target network device sends a sequence number allocation request message to the source network device, to request to allocate the sequence number.

The sequence number allocation request message may include at least one of the following:

a quantity of sequence numbers that are requested to be allocated, and a quantity of remaining sequence numbers that are unallocated. For example, there are 20 sequence numbers remaining unallocated out of 100 sequence numbers that are allocated last time.

In addition, when the source network device receives the sequence number allocation request message, a quantity of sequence numbers allocated to the target network device may be less than or equal to the quantity of sequence numbers that are requested to be allocated by the sequence number allocation request message.

Embodiments further provide a method that may be applied to a scenario in which the terminal device supports processing the cascaded data packet, but the target network device does not support to process the cascaded data packet. Details are described below.

Figure 12A:
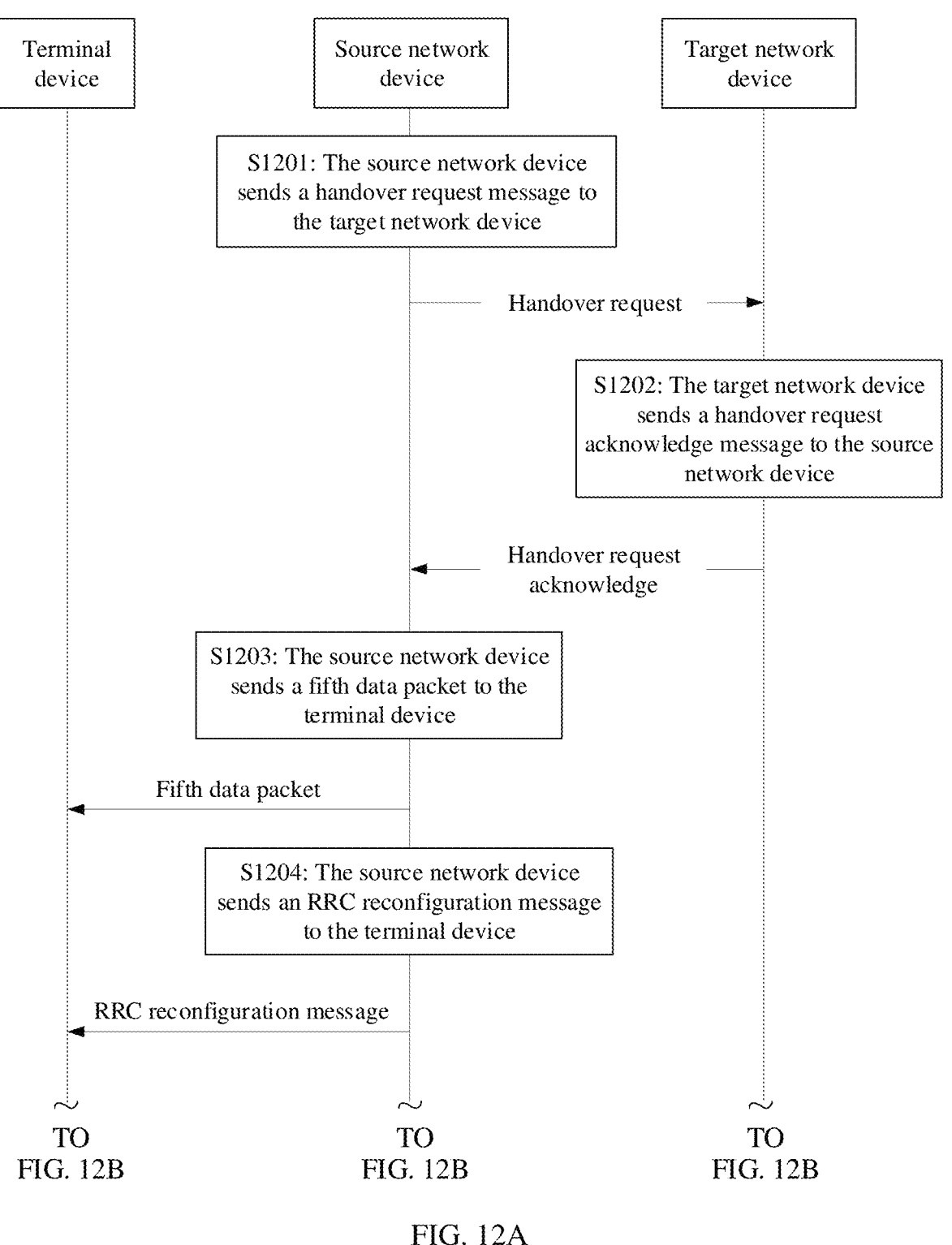

FIG. 12A and FIG. 12B are a schematic flowchart of a data transmission method according to an embodiment. In a procedure shown in FIG. 12A and FIG. 12B, an example in which a terminal device is handed over from a source network device to a target network device is used for description. The method includes the following steps.

S1201 (Optional): The source network device sends a handover request message to the target network device.

The handover request message requests to hand over the terminal device to the target network device. For information included in the handover request message, refer to the description in the procedure shown in FIG. 5 or FIG. 10. Details are not described herein again.

In this embodiment, before sending the handover request message, the source network device may further perform another handover procedure. For details, refer to the procedure in FIG. 3. Details are not described herein again.

S1202 (Optional): The target network device sends a handover request acknowledge message to the source network device.

The handover request acknowledge message may include an RRC reconfiguration message. The RRC reconfiguration message indicates the terminal device to be handed over to a target cell of the target network device.

S1203: The source network device sends a fifth data packet to the terminal device.

The fifth data packet is obtained by cascading at least two data units, and the at least two data units include a first data unit and a second data unit. A sequence number of the fifth data packet is a fifth sequence number. Data in the data units of the fifth data packet belongs to a same radio bearer or quality of service flow of the terminal device. In other words, data in the first data unit and data in the second data unit belong to a same radio bearer or quality of service flow of the terminal device.

S1204: The source network device sends the RRC reconfiguration message to the terminal device.

When receiving the RRC reconfiguration message, the terminal device disconnects a connection from the source network device, that is, disconnects a source link.

If the source network device determines that the terminal device fails to receive the fifth data packet, the source network device may forward the data in the fifth data packet to the target network device. How the source network device determines that the terminal device fails to receive the fifth data packet is not limited. For example, the source network device receives a negative acknowledgement (NACK) corresponding to the fifth data packet. In this case, the source network device may determine that the terminal device fails to receive the fifth data packet.

When the source network device forwards the data in the fifth data packet to the target network device, because the target network device does not support processing the cascaded data packet, the source network device separately sends data units cascaded in the fifth data packet to the target network device.

For example, the first data unit and the second data unit are used as examples. The source network device performs the following steps.

S1205: The source network device sends the first data unit, the second data unit, and the fifth sequence number to the target network device.

In this embodiment, the source network device may allocate a first temporary sequence number to the first data unit, and allocate a second temporary sequence number to the second data unit. The first temporary sequence number indicates a sequence of the first data unit in at least two data units that correspond to the fifth sequence number. The second temporary sequence number indicates a sequence of the second data unit in the at least two data units that correspond to the fifth sequence number.

S1206: The target network device receives the first data unit, the second data unit, and the fifth sequence number that are from the source network device.

The target network device may determine, based on the first temporary sequence number and the second temporary sequence number, the sequences of the first data unit and the second data unit in the at least two data units that correspond to the fifth sequence number.

S1207: The target network device sends the first data unit, a first subsequence number corresponding to the first data unit, the second data unit, a second subsequence number corresponding to the second data unit, and the fifth sequence number to the terminal device.

The subsequence number indicates a sequence of a data unit corresponding to the subsequence number in the at least two data units. For example, the first subsequence number indicates the sequence of the first data unit in the at least two data units that correspond to the fifth sequence number. The second subsequence number indicates the sequence of the second data unit in the at least two data units that correspond to the fifth sequence number.

The first data unit further includes location indication information, where the location indication information in the first data unit indicates whether the first data unit is a last data unit corresponding to the fifth sequence number. Similarly, the second data unit further includes location indication information, where the location indication information in the second data unit indicates whether the second data unit is the last data unit corresponding to the fifth sequence number.

S1208: The terminal device receives the first data unit, the first subsequence number corresponding to the first data unit, the second data unit, the second subsequence number corresponding to the second data unit, and the fifth sequence number.

The terminal device may determine the sequence of the first data unit and the second data unit based on the first subsequence number, the second subsequence number, and the fifth sequence number, to reorder the first data unit and the second data unit, and then deliver the first data unit and the second data unit to an upper layer of the terminal device in sequence for processing. The upper layer may be an IP layer or a transmission control protocol (TCP) layer.

Figure 13:
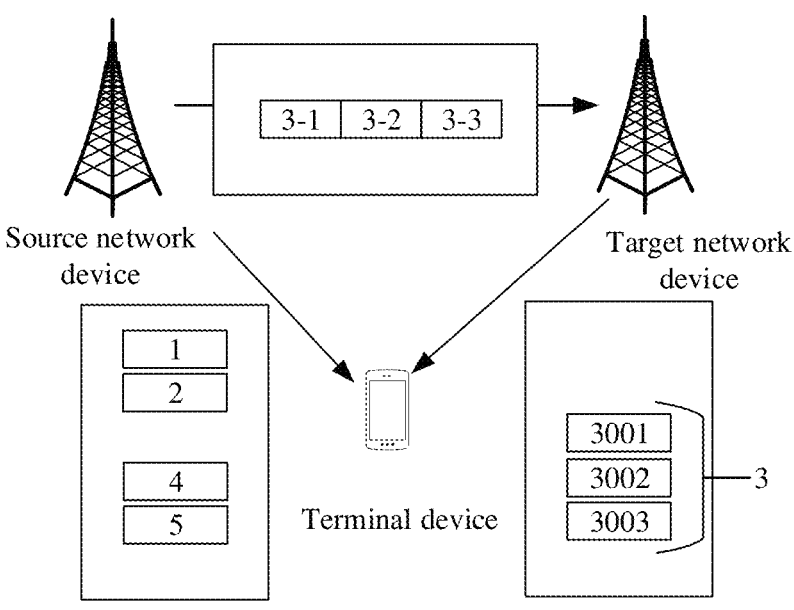
FIG. 13 is a schematic diagram of data transmission in a handover process according to an embodiment.

For example, FIG. 13 is a schematic diagram of handover according to an embodiment with reference to the foregoing description. In FIG. 13, a source network device sends data packets whose sequence numbers are respectively 1 to 5 to a terminal device. All data packets, other than the data packet whose sequence number is 3 and that the terminal device fails to receive, are successfully received by the terminal device. Three data units are cascaded in the data packet whose sequence number is 3, and it is assumed that the three data units are respectively data units 1 to 3.

When the terminal device is handed over to a target network device, the source network device separately sends the data units 1 to 3 to the target network device, and also sends the sequence number 3 to the network device. Temporary sequence numbers respectively allocated by the source network device for the data units 1 to 3 are 3-1, 3-2, and 3-3.

When receiving the data units 1 to 3, the target network device may separately allocate subsequence numbers to the data units 1 to 3. For example, the allocated subsequence numbers are 3001, 3002, and 3003. The target network device may send the data units 1 to 3, the subsequence numbers of the data units, and the sequence number 3 corresponding to the data units 1 to 3 to the terminal device. Each data unit may further correspond to one piece of location indication information.

After receiving the data and the information, the terminal device may determine, based on the sequence number 3, that the data units 1 to 3 are located between the data packet with the sequence number 2 and the data packet with the sequence number 4. The terminal device may further determine a sequence of the data units 1 to 3 based on the subsequence numbers of the data units. Therefore, the terminal device may deliver the data packets in sequence.

According to the method provided in this embodiment, the target network device further allocates one subsequence number to each data unit, so that a sequence of a plurality of data packets corresponding to one sequence number can be determined based on the subsequence numbers, thereby ensuring that the plurality of data packets corresponding to one sequence number can be delivered in sequence.

The foregoing embodiments may be separately implemented, or may be implemented in combination with each other. In the foregoing content, in different embodiments, differences among embodiments are described in detail. For content, other than content of the differences, of the different embodiments, reference may be made to each other. It should be understood that step numbers in the flowcharts described in embodiments are merely examples of an execution procedure, and do not constitute a limitation on an execution sequence of the steps. In embodiments, there is no strict execution sequence between steps that are independent of each other in a time sequence. In addition, not all the steps shown in the flowcharts are mandatory steps. Some steps may be added to or deleted from the flowcharts according to an actual requirement.

In the foregoing embodiments provided, the methods provided in embodiments are separately described from a perspective of interaction between devices. The steps performed by an access network device may alternatively be separately implemented by different communication apparatuses. For example, a first apparatus is configured to receive a first signal and initiate random access, and a second apparatus is configured to process the first signal by using energy provided by the first signal. In other words, the first apparatus and the second apparatus jointly complete the steps performed by the access network device in embodiments. A specific division manner is not limited. Optionally, energy extraction from the first signal may be alternatively executed by a third apparatus. When a network architecture includes one or more distributed units (DUs), one or more central units (CUs), and one or more radio frequency units (RUs), the steps performed by the access network device may be separately implemented by the DU, the CU, and the RU.

To implement the functions in the methods provided in embodiments, the access network device, the terminal device, or the foregoing communication apparatus may include a hardware structure and/or a software module, and implement the foregoing functions in a form of a hardware structure, a software module, or a combination of a hardware structure and a software module. Whether a specific function in the foregoing functions is performed by using the hardware structure, the software module, or the combination of the hardware structure and the software module depends on particular applications and design constraints of the solutions.

In embodiments, module division is an example, and is merely logical function division. In an actual implementation, another division manner may be used. In addition, functional modules in embodiments may be integrated into one processor, may exist alone physically, or two or more modules may be integrated into one module. The integrated module may be implemented in a form of hardware, or may be implemented in a form of a software functional module.

Figure 14:
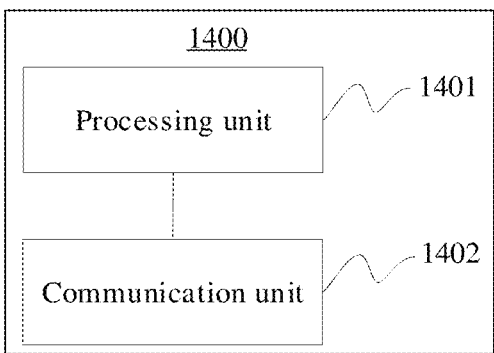
FIG. 14 is a schematic diagram of a structure of a communication apparatus according to an embodiment.

Same as the foregoing concept, as shown in FIG. 14, embodiments further provide a communication apparatus. The communication apparatus 1400 may be the source base station in FIG. 2, and is configured to implement the method for a source network device in the foregoing method embodiments. Alternatively, the communication apparatus may be the target base station in FIG. 2, and is configured to implement the method corresponding to a target network device in the foregoing method embodiments. For a specific function, refer to the descriptions in the foregoing method embodiments.

For example, the communication apparatus 1400 may include a processing unit 1401 and a communication unit 1402. In this embodiment, the communication unit may also be referred to as a transceiver unit, and may include a transmit unit and/or a receive unit, respectively configured to perform steps of sending and receiving of the network device or the terminal device in the foregoing method embodiments. The following describes in detail the communication apparatus provided in embodiments with reference to FIG. 12A to FIG. 13.

In some possible implementations, behaviors and functions of the source network device in the foregoing method embodiments may be implemented by using the communication apparatus 1400, for example, the methods performed by the source network device in embodiments shown in FIG. 6A to FIG. 12B are implemented. For example, the communication apparatus 1400 may be a source network device, may be a component (for example, a chip or a circuit) used in the source network device, or may be a chip or a chip set in the source network device, or a part of a chip that is configured to perform a related method function. The communication unit 1402 may be configured to perform a receiving or sending operation performed by the source network device in embodiments shown in FIG. 6A to FIG. 12B. The processing unit 1401 may be configured to perform an operation, other than the receiving and sending operations, performed by the source network device in embodiments shown in FIG. 6A to FIG. 12B.

In a possible implementation, the processing unit is configured to perform cascading processing on at least two data units to obtain a first data packet. Data included in the at least two data units belongs to a same radio bearer or quality of service flow of the terminal device. The first data packet is a packet data convergence protocol (PDCP) layer data packet or a service data adaptation protocol (SDAP) layer data packet. The communication unit is configured to send the first data packet to the target network device through a first tunnel.

In a possible implementation, the communication unit is further configured to send first information to the target network device through the first tunnel. The first information indicates that the first data packet is a cascaded data packet.

In a possible implementation, the communication unit is further configured to:

send a second data packet and second information to the target network device through the first tunnel, where the second information indicates that the second data packet is a non-cascaded data packet, and data in the second data packet and data in the first data packet belong to a same radio bearer or quality of service flow of the terminal device.

In a possible implementation, the communication unit is further configured to send the second data packet to the target network device through the second tunnel, where the second data packet is the non-cascaded data packet, and the data in the second data packet and the data in the first data packet belong to a same radio bearer or quality of service flow of the terminal device.

In a possible implementation, a data size of the first data packet is X, and a maximum value of X is less than or equal to a smaller value of a first maximum data volume and a second maximum data volume, or the maximum value of X is less than or equal to a smallest value of the first maximum data volume, the second maximum data volume, and a third maximum data volume, where X is a number greater than 0.

The first maximum data volume is a maximum data volume that is of a cascaded data packet and that is supported by the source network device, the second maximum data volume is a maximum data volume that is of a cascaded data packet and that is supported by the target network device, and the third maximum data volume is a maximum data volume that is of a cascaded data packet and that is supported by the terminal device.

In a possible implementation, Y data units are cascaded in the first data packet, a maximum value of Y is less than or equal to a smaller value of a first maximum value and a second maximum value, or the maximum value of Y is less than or equal to a smallest value of the first maximum value, the second maximum value, and a third maximum value, and Y is an integer greater than 1.

The first maximum value is a maximum value that is of a quantity of data units cascaded to obtain a cascaded data packet and that is supported by the source network device, the second maximum value is a maximum value that is of a quantity of data units cascaded to obtain a cascaded data packet and that is supported by the target network device, and the third maximum value is a maximum value that is of a quantity of data units cascaded to obtain a cascaded data packet and that is supported by the terminal device.

In a possible implementation, the communication unit is further configured to send a third data packet to the terminal device, where the third data packet is obtained by cascading M data units, M is an integer greater than 1, and data in the third data packet and the data in the first data packet belong to a same radio bearer or quality of service flow of the terminal device.

In a possible implementation, a data size of the third data packet is P, and a maximum value of P is less than or equal to a smaller value of the first maximum data volume and the third maximum data volume, or the maximum value of P is less than or equal to the smallest value of the first maximum data volume, the second maximum data volume, and the third maximum data volume, where P is a real number greater than 0.

The first maximum data volume is the maximum data volume that is of a cascaded data packet and that is supported by the source network device, the second maximum data volume is the maximum data volume that is of a cascaded data packet and that is supported by the target network device, and the third maximum data volume is the maximum data volume that is of a cascaded data packet and that is supported by the terminal device.

In a possible implementation, a maximum value of M is less than or equal to a smaller value of the first maximum value and the third maximum value, or the maximum value of M is less than or equal to the smallest value of the first maximum value, the second maximum value, and the third maximum value.

The first maximum value is the maximum value that is of a quantity of data units cascaded to obtain a cascaded data packet and that is supported by the source network device, the second maximum value is the maximum value that is of a quantity of data units cascaded to obtain a cascaded data packet and that is supported by the target network device, and the third maximum value is the maximum value that is of a quantity of data units cascaded to obtain a cascaded data packet and that is supported by the terminal device.

In some possible implementations, behaviors and functions of the target network device in the foregoing method embodiments may be implemented by using the communication apparatus 1400, for example, the methods performed by the target network device in embodiments shown in FIG. 6A to FIG. 12B are implemented. For example, the communication apparatus 1400 may be a target network device, a component (for example, a chip or a circuit) used in the target network device, a chip or a chip set in the target network device, or a part of a chip that is configured to perform a related method function. The communication unit 1402 may be configured to perform a receiving or sending operation performed by the target network device in embodiments shown in FIG. 6A to FIG. 12B. The processing unit 1401 may be configured to perform an operation, other than the receiving and sending operations, performed by the target network device in embodiments shown in FIG. 6A to FIG. 12B.

In a possible implementation, the processing unit is configured to receive a first data packet from the source network device by using the communication unit through the first tunnel. The first data packet is a data packet obtained by cascading at least two data units, data included in the at least two data units belongs to a same radio bearer or quality of service flow of the terminal device, and the first data packet is a packet data convergence protocol (PDCP) layer data packet or a service data adaptation protocol (SDAP) layer data packet.

The processing unit is configured to send the first data packet to the terminal device by using the communication unit.

In a possible implementation, the communication unit is further configured to:

receive first information from the source network device through the first tunnel, where the first information indicates that the first data packet is a cascaded data packet; and send the first information to the terminal device.

In a possible implementation, the communication unit is further configured to: receive the second data packet and the second information from the source network device through the first tunnel, where the second information indicates that the second data packet is a non-cascaded data packet, and data in the second data packet and data in the first data packet belong to a same radio bearer or quality of service flow of the terminal device; and send the second data packet and the second information to the terminal device.

In a possible implementation, the communication unit is further configured to:

receive the second data packet from the source network device through the second tunnel, where the second data packet is the non-cascaded data packet, and the data in the second data packet and the data in the first data packet belong to a same radio bearer or quality of service flow of the terminal device; and send the second data packet to the terminal device.

In a possible implementation, the communication unit is further configured to:

receive a plurality of non-cascaded data packets from the source network device, where one non-cascaded data packet includes one data unit; and send a fourth data packet to the terminal device, where the fourth data packet is obtained by cascading data units of at least two of the plurality of non-cascaded data packets.

In a possible implementation, a sequence number corresponding to the fourth data packet is within a sequence number value range, the sequence number value range includes at least one sequence number, and the sequence number value range is from the source network device.

The foregoing is merely an example. The processing unit 1401 and the communication unit 1402 may further perform another function. For more detailed descriptions, refer to the related descriptions in the method embodiments shown in FIG. 6A to FIG. 12B. Details are not described herein again.

Figure 15:
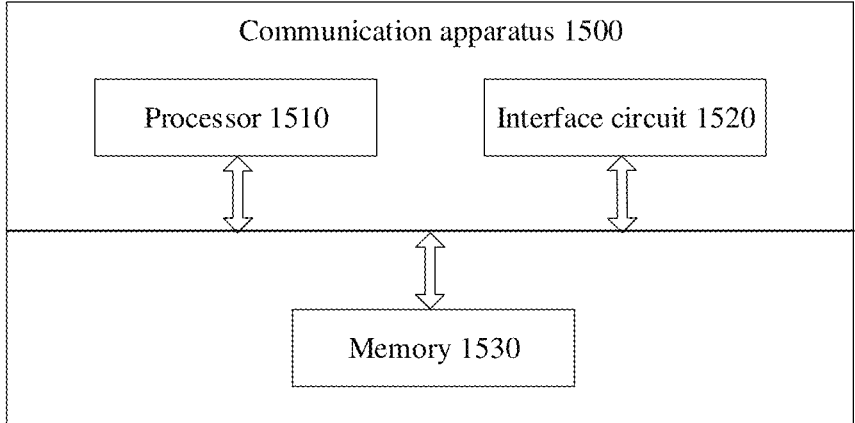
FIG. 15 is a schematic diagram of a structure of a communication apparatus according to an embodiment.

FIG. 15 shows a communication apparatus according to an embodiment. The communication apparatus shown in FIG. 15 may be an implementation of a hardware circuit of the communication apparatus shown in FIG. 14. The communication apparatus is applicable to the foregoing flowcharts, and performs functions of the terminal device or the network device in the foregoing method embodiments. For ease of description, FIG. 15 shows only main components of the communication apparatus.

As shown in FIG. 15, the communication apparatus 1500 includes a processor 1510 and an interface circuit 1520. The processor 1510 and the interface circuit 1520 are coupled to each other. It may be understood that the interface circuit 1520 may be a transceiver or an input/output interface. Optionally, the communication apparatus 1500 may further include a memory 1530, configured to store instructions executed by the processor 1510, store input data required by the processor 1510 to run the instructions, or store data generated after the processor 1510 runs the instructions.

When the communication apparatus 1500 is configured to implement the methods shown in FIG. 6A to FIG. 12B, the processor 1510 is configured to implement functions of the processing unit 1401, and the interface circuit 1520 is configured to implement functions of the communication unit 1402.

When the communication apparatus is a chip used in the terminal device, the chip in the terminal device implements functions of the terminal device in the foregoing method embodiments. The chip in the terminal device receives information from another module (for example, a radio frequency module or an antenna) in the terminal device, where the information is sent by the network device to the terminal device. Alternatively, the chip in the terminal device sends information to another module (for example, a radio frequency module or an antenna) in the terminal device, where the information is sent by the terminal device to the network device.

When the communication apparatus is a chip used in the network device, the chip in the network device implements functions of the network device in the foregoing method embodiments. The chip in the network device receives the information from another module (for example, a radio frequency module or an antenna) in the network device, where the information is sent by the terminal device to the network device. Alternatively, the chip in the network device sends the information to another module (for example, a radio frequency module or an antenna) in the network device, where the information is sent by the network device to the terminal device.

It may be understood that the processor in embodiments may be a central processing unit (CPU), or may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, or may be any conventional processor.

In embodiments, the processor may be a random access memory (RAM), a flash memory, a read-only memory (ROM), a programmable read-only memory (PROM), an erasable programmable read-only memory (EPROM), an electrically erasable programmable read-only memory (EE-PROM), a register, a hard disk, a removable hard disk, a CD-ROM, or a storage medium in any other form well-known in the art. For example, a storage medium is coupled to the processor, so that the processor is enabled to read information from the storage medium and write information into the storage medium. Further, the storage medium may be a component of the processor. The processor and the storage medium may be disposed in the ASIC. In addition, the ASIC may be located in the network device or the terminal device. Additionally, the processor and the storage medium may alternatively exist as discrete components in the network device or the terminal device.

A person skilled in the art should understand that embodiments may be provided as a method, a system, or a computer program product. Therefore, the embodiments may use a form of a hardware-only embodiment, a software-only embodiment, or an embodiment with a combination of software and hardware. In addition, the embodiments may use a form of a computer program product that is implemented on one or more non-transitory computer-usable storage media (including, but not limited to, a disk memory, an optical memory, and the like) that include non-transitory computer-usable program code.

The embodiments are described with reference to the flowcharts and/or block diagrams of the methods, the devices (systems), and the computer program product according to the embodiments. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a non-transitory computer-readable memory that can instruct the computer or any other programmable data processing device to work in a specific manner, so that the instructions stored in the non-transitory computer-readable memory generate an artifact that includes an instruction apparatus. The instruction apparatus implements a specific function in one or more procedures in the flowcharts and/or in one or more blocks in the block diagrams.

It is clearly that, a person skilled in the art can make various modifications and variations to the embodiments without departing from their scope. is the embodiments are intended to cover these modifications and variations provided that they fall within the scope of defined by the embodiments and their equivalent technologies.

What is claimed is:

1. A method, wherein the method is applied to a source network device, the method comprising:

performing cascading processing on at least two data units to obtain a first data packet, wherein data comprised in the at least two data units belongs to a same radio bearer or quality of service flow of a terminal device, and the first data packet comprises a cascaded header shared by the at least two data units and is a packet data convergence protocol (PDCP) layer data packet or a service data adaptation protocol (SDAP) layer data packet;

sending the first data packet to a target network device through a first tunnel;

sending a second data packet to the target network device through a second tunnel, wherein the second data packet is a non-cascaded data packet, and data in the second data packet and data in the first data packet belong to the same radio bearer or quality of service flow of the terminal device.

2. The method according to claim 1, further comprising:

sending first information to the target network device through the first tunnel, wherein the first information indicates that the first data packet is a cascaded data packet.

3. The method according to claim 2, further comprising: sending the second data packet and second information to the target network device through the first tunnel, wherein the second information indicates that the second data packet is the non-cascaded data packet, and the data in the second data packet and the data in the first data packet belong to the same radio bearer or quality of service flow of the terminal device.

4. The method according to claim 1, further comprising:

receiving address information of the first tunnel from the target network device.

5. The method according to claim 1, wherein a data size of the first data packet is X, a maximum value of X is less than or equal to a smaller value of a first maximum data volume and a second maximum data volume, or a maximum value of X is less than or equal to a smallest value of a first maximum data volume, a second maximum data volume, and a third maximum data volume, and X is a number greater than 0, wherein the first maximum data volume is a maximum data volume that is of a cascaded data packet and that is supported by the source network device, the second maximum data volume is a maximum data volume that is of a cascaded data packet and that is supported by the target network device, and the third maximum data volume is a maximum data volume that is of a cascaded data packet and that is supported by the terminal device.

6. A method, wherein the method is applied to a target network device, the method comprising:

receiving a first data packet from a source network device through a first tunnel, wherein the first data packet is a data packet obtained by cascading at least two data units and comprises a cascaded header shared by the at least two data units, data comprised in the at least two data units belongs to a same radio bearer or quality of service flow of a terminal device, and the first data packet is a packet data convergence protocol (PDCP) layer data packet or a service data adaptation protocol (SDAP) layer data packet;

sending the first data packet to the terminal device;

receiving a second data packet from the source network device through a second tunnel, wherein the second data packet is a non-cascaded data packet, and data in the second data packet and data in the first data packet belong to the same radio bearer or quality of service flow of the terminal device; and sending the second data packet to the terminal device.

7. The method according to claim 6, further comprising:

receiving first information from the source network device through the first tunnel, wherein the first information indicates that the first data packet is a cascaded data packet; and sending the first information to the terminal device.

8. The method according to claim 7, further comprising:

receiving the second data packet and second information from the source network device through the first tunnel, wherein the second information indicates that the second data packet is the non-cascaded data packet, and the data in the second data packet and the data in the first data packet belong to the same radio bearer or quality of service flow of the terminal device; and sending, by the target network device, the second data packet and the second information to the terminal device.

9. The method according to claim 6, wherein a data size of the first data packet is X, a maximum value of X is less than or equal to a smaller value of a first maximum data volume and a second maximum data volume, or a maximum value of X is less than or equal to a smallest value of a first maximum data volume, a second maximum data volume, and a third maximum data volume, and X is a real number greater than 0, wherein the first maximum data volume is a maximum data volume that is of a cascaded data packet and that is supported by the source network device, the second maximum data volume is a maximum data volume that is of a cascaded data packet and that is supported by the target network device, and the third maximum data volume is a maximum data volume that is of a cascaded data packet and that is supported by the terminal device.

10. A data transmission apparatus, comprising:

at least one processor; and a memory coupled to the at least one processor and configured to store executable instructions for execution by the at least one processor to instruct the at least one processor to:

perform cascading processing on at least two data units to obtain a first data packet, wherein data comprised in the at least two data units belongs to a same radio bearer or quality of service flow of a terminal device, and the first data packet comprises a cascaded header shared by the at least two data units and is a packet data convergence protocol (PDCP) layer data packet or a service data adaptation protocol (SDAP) layer data packet;

send the first data packet to a target network device through a first tunnel; and send a second data packet to the target network device through a second tunnel, wherein the second data packet is a non-cascaded data packet, and data in the second data packet and data in the first data packet belong to the same radio bearer or quality of service flow of the terminal device.

11. The apparatus according to claim 10, wherein the executable instructions further instruct the at least one processor to:

send first information to the target network device through the first tunnel, wherein the first information indicates that the first data packet is a cascaded data packet.

12. The apparatus according to claim 11, wherein the executable instructions further instruct the at least one processor to: send the second data packet and second information to the target network device through the first tunnel, wherein the second information indicates that the second data packet is the non-cascaded data packet, and the data in the second data packet and the data in the first data packet belong to the same radio bearer or quality of service flow of the terminal device.

13. The apparatus according to claim 10, wherein a data size of the first data packet is X, a maximum value of X is less than or equal to a smaller value of a first maximum data volume and a second maximum data volume, or a maximum value of X is less than or equal to a smallest value of a first maximum data volume, a second maximum data volume, and a third maximum data volume, and X is a number greater than 0, wherein the first maximum data volume is a maximum data volume that is of a cascaded data packet and that is supported by the source network device, the second maximum data volume is a maximum data volume that is of a cascaded data packet and that is supported by the target network device, and the third maximum data volume is a maximum data volume that is of a cascaded data packet and that is supported by the terminal device.

14. A data transmission apparatus, comprising:
at least one processor; and a memory coupled to the at least one processor and configured to store executable instructions for execution by the at least one processor to instruct the at least one processor to:

receive a first data packet from a source network device through a first tunnel, wherein the first data packet is a data packet obtained by cascading at least two data units and comprises a cascaded header shared by the at least two data units, data comprised in the at least two data units belongs to a same radio bearer or quality of service flow of a terminal device, and the first data packet is a packet data convergence protocol (PDCP) layer data packet or a service data adaptation protocol (SDAP) layer data packet;

send the first data packet to the terminal device;

receive a second data packet from the source network device through a second tunnel, wherein the second data packet is a non-cascaded data packet, and data in the second data packet and data in the first data packet belong to the same radio bearer or quality of service flow of the terminal device; and send the second data packet to the terminal device.

15. The apparatus according to claim 14, wherein the executable instructions further instruct the at least one processor to:

receive first information from the source network device through the first tunnel, wherein the first information indicates that the first data packet is a cascaded data packet; and send the first information to the terminal device.

16. The apparatus according to claim 15, wherein the executable instructions further instruct the at least one processor to: receive the second data packet and second information from the source network device through the first tunnel, wherein the second information indicates that the second data packet is the non-cascaded data packet, and the data in the second data packet and the data in the first data packet belong to the same radio bearer or quality of service flow of the terminal device; and send, by the target network device, the second data packet and the second information to the terminal device.

* * * * *